(12) United States Patent
Golovin et al.

(10) Patent No.: US 7,463,228 B2
(45) Date of Patent: Dec. 9, 2008

(54) FAST SWITCHING DUAL-FREQUENCY LIQUID CRYSTAL CELLS AND METHOD FOR DRIVING THE SAME

(75) Inventors: Andrii Golovin, Kent, OH (US); Sergij Shiyanovskii, Kent, OH (US); Oleg Lavrentovich, Kent, OH (US)

(73) Assignee: Kent State University, Kent, OH (US)

( * ) Notice: Subject to any disclaimer, the term of this patent is extended or adjusted under 35 U.S.C. 154(b) by 925 days.

(21) Appl. No.: 10/472,677

(22) PCT Filed: Jan. 16, 2003

(86) PCT No.: PCT/US03/01397

§ 371 (c)(1), (2), (4) Date: Mar. 25, 2004

(87) PCT Pub. No.: WO03/063126

PCT Pub. Date: Jul. 31, 2003

(65) Prior Publication Data

US 2004/0150598 A1    Aug. 5, 2004

(51) Int. Cl.
 *G09G 3/36* (2006.01)
(52) U.S. Cl. ............................. 345/87; 345/97
(58) Field of Classification Search ............... 345/87, 345/90, 97, 204; 349/86, 156
See application file for complete search history.

(56) References Cited

U.S. PATENT DOCUMENTS

| 4,380,008 | A | * | 4/1983 | Kawakami et al. ............ 345/94 |
| 5,668,651 | A | * | 9/1997 | Yamada et al. .............. 349/156 |
| 6,154,267 | A | * | 11/2000 | Kondo et al. ................ 349/156 |
| 2001/0040651 | A1 | * | 11/2001 | Toko ............................ 349/86 |
| 2004/0191427 | A1 | * | 9/2004 | Wood et al. .................. 428/1.2 |

* cited by examiner

*Primary Examiner*—Ricardo L Osorio
(74) *Attorney, Agent, or Firm*—Fay Sharpe LLP

(57) ABSTRACT

A method for fast switching a dual frequency (FIG. 3) liquid crystal cell is disclosed. The liquid crystal cell has opposed substrates (12) with a dual frequency liquid crystal material (18) disposed therebetween. Each substrate has an electrode that is connected to a power supply (20) that is able to apply different voltage magnitudes at different frequencies. And each substrate (12) has an alignment layer that imparts a high pretilt angle to the liquid crystal material, wherein no application of voltage results in the material exhibiting an initial state. A transition driving pulse (104) of a first magnitude is applied to the material at a first frequency to accelerate a transition into a first state from the initial state. A holding pulse (102) of a second magnitude is applied to the material at the first frequency to maintain the first state, wherein the second magnitude is less than the first magnitude.

19 Claims, 24 Drawing Sheets

$\alpha \sim 45°$

FAST SWITCHING DUAL-FREQUENCY LIQUID CRYSTAL CELLS AND METHOD FOR DRIVING THE SAME

GOVERNMENT RIGHTS

The United States Government has a paid-up license in this invention and may have the right in limited circumstances to require the patent owner to license others on reasonable terms as provided for by the terms of Grant No. F33615-00-1-1681, awarded by the Defense Advanced Research Projects Agency (DARPA).

TECHNICAL FIELD

The present invention is generally directed to nematic liquid crystal cells. In particular, the present invention is directed to dual frequency nematic liquid crystal cells and methods for switching the same. Specifically, the present invention is directed to nematic electrooptical devices with fast (millisecond and less) switching of the optical phase retardation.

BACKGROUND ART

The effective optical birefringence of a nematic liquid crystal can be changed by an applied electric field in the range between $\Delta n = n_e - n_o$ and zero; where $n_e$ is the extraordinary refractive index and $n_o$ is the ordinary refractive index of the liquid crystal material. This property of birefringence is used in most optical phase modulators based on liquid crystals. When one considers a nematic cell with a normally incident light beam, the axis z is perpendicular to the cell substrates separated by a distance d. The effective optical birefringence is the function of the angle $\theta(z)$ between the liquid crystal's director and the axis z may be defined as:

$$\Delta n_{eff}(z) = n_{e,eff}(z) - n_o = \frac{n_e n_o}{\sqrt{n_o^2 \sin^2\theta(z) + n_e^2 \cos^2\theta(z)}} - n_o, \quad (1)$$

where $\theta(z)$ depends on the applied voltage U, and material properties such as elastic constants, cell thickness, surface anchoring, etc. For the so-called planar state, $\theta(z)=\pi/2$, for the homeotropic state $\theta(z)=0$. Therefore, a nematic cell of thickness d might produce a maximum phase shift $$\Delta\varphi = \frac{2\pi}{\lambda} \int_0^d \Delta n_{eff}(z) dz = \frac{2\pi d}{\lambda}(n_e - n_o), \quad (2)$$

when it is reoriented by an applied field from the planar state into a homeotropic state.

Technical applications of this type of phase modulators are limited by the relatively slow response time of the liquid crystal material. The time $\tau_{on}$ of director reorientation caused by the applied voltage U and the time $\tau_{off}$ of relaxation to the initial state when the applied voltage is switched off are often estimated as:

$$\tau_{on} = \frac{\gamma_1 d^2}{\varepsilon_0 |\Delta\varepsilon|(U^2 - U_c^2)}, \quad (3)$$

$$\tau_{off} = \frac{\gamma_1 d^2}{\pi^2 K}, \quad (4)$$

where $\varepsilon_0$ is the permittivity of free space, $\gamma_1$ is the rotational viscosity of the nematic liquid crystal, $\Delta\varepsilon = \varepsilon_\parallel - \varepsilon_\perp$ is the dielectric anisotropy, $\varepsilon_\parallel$ and $\varepsilon_\perp$ are the principal dielectric permittivites referred to the nematic director, $$U_c = \pi \sqrt{\frac{K}{\varepsilon_0 |\Delta\varepsilon|}}$$

is a certain threshold value of the applied voltage, and K is the characteristic elastic constant. According to Eq.(3), one can decrease $\tau_{on}$ by increasing the applied voltage. However, a high applied voltage means that the director is reoriented into a narrow range of the values of $\theta(z)$ (e.g., close to $\theta(z)=0$ for $\Delta\varepsilon>0$). Moreover, the relaxation time $\tau_{off}$ depends only on the material parameters and the thickness of the cell and cannot be made shorter by a higher electric field, see Eq.(4).

As clear from the dependencies in equations 3 and 4, thin cells are better suited for fast relaxation, as $\tau_{off}, \tau_{on} \sim d^2$. The drawback is that smaller d means a smaller phase shift, as $\Delta\varphi \sim d$, see Eq.(2). Accordingly, requirement of fast (millisecond and less) switching is contradictory to the desire for a broad range of switched phase retardations ($3\pi$ and more). Fast switching implies thin cells, but a broad range of switched phase retardations requires thick cells. For example, cells with $d \sim 5$-$10$ μm result in a phase shift higher than $2\pi$ in the optical region, but the relaxation time $\tau_{off}$ is of the order of 10-100 ms, depending on the viscosity and elastic constants of the nematic liquid crystal. Note that the so-called backflow effects caused by a coupling between the director reorientation and material flow generally make the experimental switching times $\tau_{on}$ and $\tau_{off}$ even larger than those predicted by Eqs.(3) and (4).

One known liquid crystal phase retardation device that uses frequency modulated liquid crystal material is disclosed in U.S. Pat. No. 6,456,419. This patent discloses a liquid crystal cell which has electrodes on each substrate that are positioned orthogonally to one another so as to form a plurality of pixels. The device in the '419 patent actively drives each electrode with an oscillating voltage to apply a voltage and related frequency to a particular pixel. Accordingly, the dual frequency liquid crystal material changes the molecular orientations of the liquid crystal material more rapidly than a passively relaxing liquid crystal and can, therefore, achieve switching speeds of greater than 1 kHz. Although the '419 patent discloses a device that is an improvement in the art, it is believed that the switching speeds disclosed are still not as fast as they could be for beam steering and phase modulation devices.

Therefore, there is a need in the art for a fast switching liquid crystal cell with a broad range of phase retardations and which uses the so-called dual-frequency nematic materials in cells with a very high pretilt angle driven by a sequence of electric pulses of different frequency and amplitude.

SUMMARY OF THE INVENTION

It is, therefore, a primary object of the present invention to provide a method for fast switching a dual frequency liquid crystal cell, comprising; providing a liquid crystal cell, wherein the cell has opposed substrates with dual frequency liquid crystal material disposed therebetween, each substrate having at least one electrode that is connected to a power supply able to apply different voltage magnitudes at different frequencies and each substrate having an alignment layer to impart a high pretilt angle to the liquid crystal material, wherein no application of voltage results in the material exhibiting an initial state; applying a transition driving pulse of a first magnitude to the material at a first frequency to accelerate a transition into a first state from the initial state; applying a holding pulse of a second magnitude to the material at the first frequency to maintain the first state, wherein the second magnitude is less than the first magnitude; applying a transition driving pulse of a third magnitude to the material at a second frequency to accelerate a transition into a second state from the first state; and applying a holding pulse of a fourth magnitude to the material at the second frequency to maintain the second state, wherein the fourth magnitude is less than the third magnitude.

Yet a further object of the present invention is to provide a method for switching a dual frequency liquid crystal cell, comprising; providing a liquid crystal cell, wherein the cell has opposed substrates with dual frequency liquid crystal material disposed therebetween, each substrate having at least one electrode that is connected to a power supply able to apply different voltage magnitudes at different frequencies and each substrate having an alignment layer to impart a high pretilt angle to the liquid crystal material, wherein no application of voltage results in the material exhibiting an initial first state; applying transition driving pulses of a first magnitude to the material at a first frequency to obtain a first state; applying holding pulses of a second magnitude to the material at the first frequency to maintain the first state, wherein the second magnitude is less than the first magnitude; and applying transition driving pulses of a third magnitude at a second frequency to obtain said initial state, wherein the third magnitude is greater than the second magnitude.

Still yet another object of the present invention is to provide a liquid crystal cell, comprising a pair of opposed substrates having a cell gap therebetween; a dual frequency nematic liquid crystal material disposed in the cell gap; a high-tilt alignment layer disposed on each substrate to align the material into an initial state; at least one electrode coupled to each of said substrates; and a power supply connected to the pair of electrodes for i) applying a transition driving pulse to the material at a first magnitude in a first frequency range to change the initial state to a first state; and ii) applying in a holding pulse to the material at a second magnitude in the first frequency range.

These objects are obtained by employing a dual-frequency nematic liquid crystal in fast switching optical devices. A high pretilt angle between the director and the substrate is used to obtain a high value of the switched phase retardation and to minimize the response time when the cell is driven by electric pulses of different frequency and amplitude. The experimental data confirm that the dual-frequency nematic materials in high-pretilt cells are capable of fast (millisecond and less) switching times and efficient reorientation when driven by amplitude and frequency modulated voltage. Such devices could be used as optical phase modulators and retarders, beam steering devices, optical shutters, scanners, and the like.

BRIEF DESCRIPTION OF THE DRAWINGS

For a complete understanding of the objects, techniques and structure of the invention, reference should be made to the following detailed description and accompanying drawings, wherein:

FIGS. 1A-D are liquid crystal cells according to the present invention, wherein FIG. 1A shows an initial tilted orientation of the liquid crystal material, FIG. 1B shows a homeotropic orientation of the liquid crystal material, FIG. 1C shows a planar orientation of the liquid crystal material and FIG. 1D shows a planar orientation of the liquid crystal material with an in-plane electrode configuration;

FIG. 8A is a measured optical response of the C→B"→C transition, shown in FIG. 3, in a 25 ms/square time scale, while

FIG. 12 is a transition waveform from points O→A→O as seen in FIG. 11, wherein

FIG. 13A is a transition waveform from points O→B→O, as seen in FIG. 11, wherein

BEST MODE FOR CARRYING OUT THE INVENTION

Figure 1A:
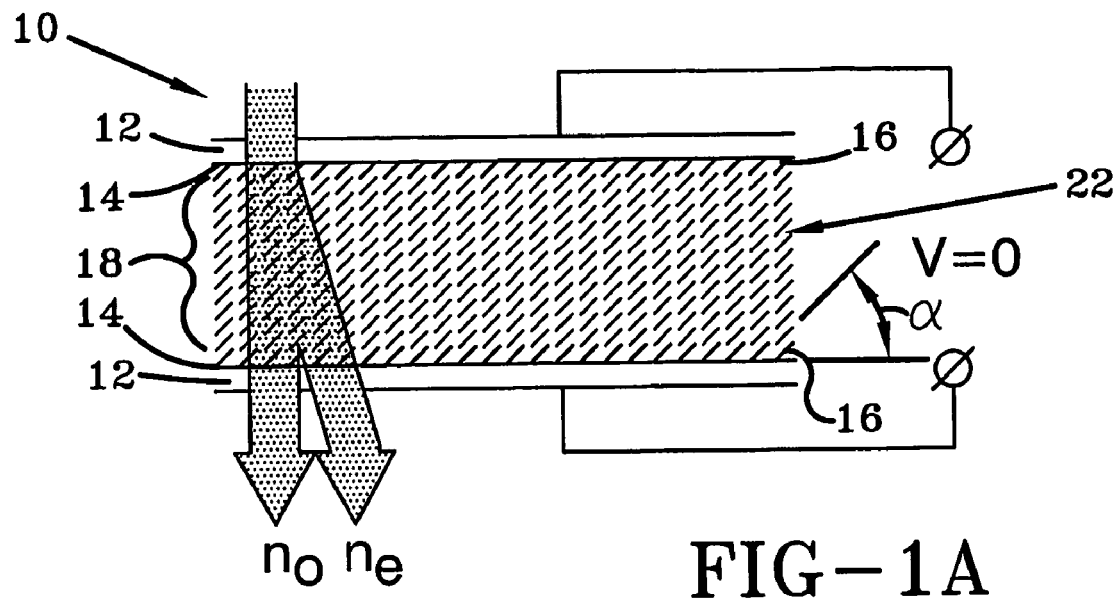

Referring now to the drawings, and in particular, to FIGS. 1A-D, it can be seen that a liquid crystal cell, according to the present invention, is designated generally by the numeral 10. The liquid crystal cell 10 includes a pair of opposed substrates 12 which may be either glass or plastic as is well known in the art Each substrate 12 has disposed thereon an electrode 14 which is preferably an indium tin oxide material or other conductive material commonly used in liquid crystal displays or devices. For the sake of simplicity, only a single electrode is shown on each substrate; however, it will be appreciated that one substrate may have a plurality of row electrodes while the other substrate may have a plurality of column electrodes. Accordingly, the intersecting row and column electrodes may form pixels which are electrically driven in an appropriate manner depending upon the end-use device. Disposed on each facing surface of the substrates is a high-tilt alignment layer 16. In the preferred embodiment, the alignment layer is a silicon oxide material which imparts a tilt to the directors of a dual frequency nematic liquid crystal material 18 which exhibits a positive dielectric anisotropy at a first range of frequencies and a negative dielectric anisotropy at a second range of frequencies. The substrates 12 are separated by spacers (not shown) to obtain a desired cell gap and are sealed in a conventional way. It will be appreciated that the liquid crystal material has a cutoff frequency that is provided at the transition between the two ranges of frequencies. A voltage supply 20 is connected to each electrode and is utilized for applying alternating current pulses which may be either square or whatever shape is desired. The voltage supply 20 and its associated electronics apply an appropriate frequency with the application of each voltage depending upon the desired end state or initial state of the material.

Figure 1B:
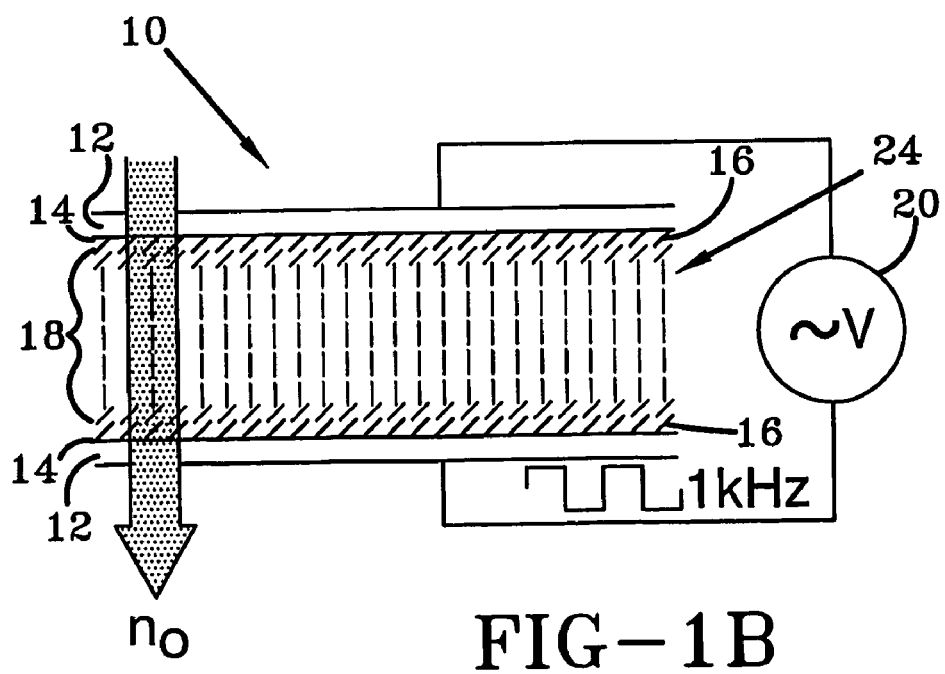
Figure 1C:
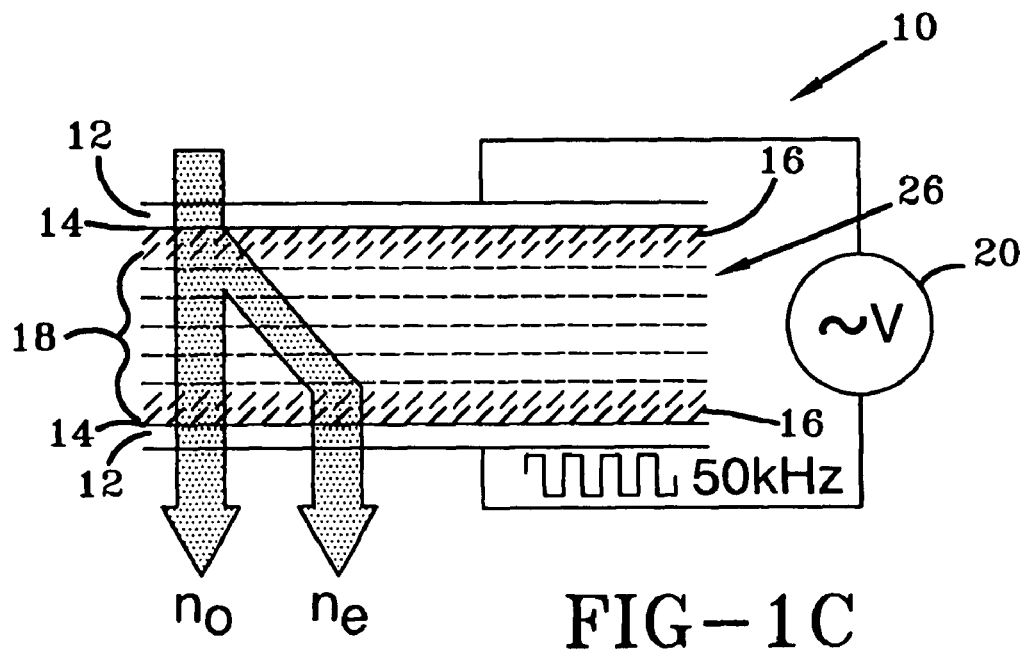
Figure 1D:
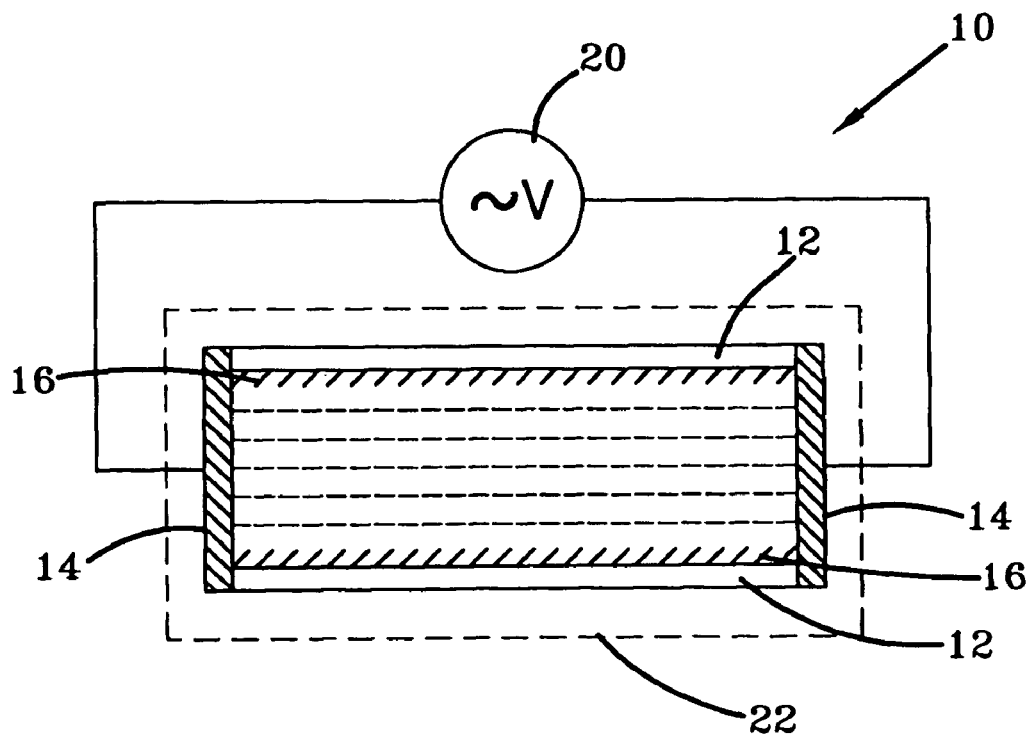

FIG. 1A shows an initial nematic tilted state of the liquid crystal material. In other words, when the liquid crystal material is initially disposed between the two substrates the alignment layers 16 impart an angle a to the liquid crystal material such that in its resting state a predetermined phase shift occurs according to Equation No. 2. When a predetermined voltage and frequency is applied across the electrodes, the material 18 exhibits a homeotropic state as seen in FIG. 1B. When a different frequency and/or voltage is applied to the cell, the material exhibits a planar state as seen in FIG. 1C. If desired, an in-plane switching configuration, as seen in FIG. 1D, may be used wherein the electrodes 14 are positioned between the substrates 12 instead of on the surfaces of the substrates. Accordingly, application of a voltage at the first frequency range will result in the material exhibiting a planar texture instead of a homeotropic texture. As seen in FIG. 1D, a temperature regulator 22 may also be associated with the cell to facilitate the switching of the liquid crystal material. Of course the temperature regulator 22 may be associated with a cell that has its electrodes on the surfaces of the substrates.

For a dual-frequency nematic material 18 the sign of dielectric anisotropy $\Delta\varepsilon$ depends on the frequency of the applied electric field. For example, the nematic material MLC-2048 sold by EM Industries has a $\Delta\varepsilon=3.22$ at frequency 1 kHz and a $\Delta\varepsilon=-3.08$ at 50 kHz (data taken at the room temperature about 20 degrees C.). Therefore, if the nematic layer is sandwiched between two transparent electrodes in a flat cell, the LC director is reoriented into the planar state by applying an electric voltage at frequency 50 kHz and into the homeotropic state by applying an electric voltage at frequency 1 kHz. It has been found that switching between different states of the cell, say, between the planar and homeotropic, or homeotropic and planar, or between any other states that are neither planar nor homeotropic, $\theta(z)\neq 0$; $\theta(z)\neq\pi/2$, is driven by voltage pulses of different frequency and magnitude. The key advantage is that all types of switching occur when an electric voltage is applied; thus the switching times can be made shorter if the applied voltage is larger. If one does not need a complete reorientation of the cell in the planar or homeotropic cell, this high-voltage pulse can be short and can be quickly followed by a "holding" voltage of appropriate frequency and usually smaller amplitude. Therefore, the sequence of voltage pulses used to reorient the LC cell from one state into another can be described as a special short pulse (SSP), also referred to herein as a transition pulse, of high amplitude (that serves to accelerate the transition into the new state) followed by a holding pulse of usually smaller amplitude that maintains the needed value of the phase retardation in the cell. It should be appreciated that the term "pulse" in reference to the transition or holding pulse may include a series of pulses at a predetermined frequency and amplitude for a duration sufficient to implement the desired liquid crystal state. Note that the electric field can be applied not only normally to the cell plates but also in any other manner, including parallel to the cell plates via the so-called in-plane switching shown in FIG. 1D.

Another important element of the inventive technique of fast and efficient switching is that the nematic cell 10 may be assembled in an anti-parallel fashion from plates with a high pretilt angle. The pretilt angle is the angle between the director and the substrate. The high value of pretilt angle has several advantages. First, the dielectric torque of the applied field is maximized when the angle between the director and the field is preferably about 45 degrees. Second, there is no voltage threshold required for director reorientation. Third, a high pretilt guarantees strong restoring surface torques that facilitate reorientation from both the homeotropic and the planar states. A high value of the director pretilt angle $\alpha\approx 45$ degrees, shown in FIG. 1, can be achieved by oblique deposition of SiO layers. It is believed that a pretilt angle of anywhere between 10 to 80 degrees will work with an appropriate adjustment to the amplitude and frequency of the applied voltages. Variation of the pretilt angle might be used as a parameter to optimize the cell preparation process or to optimize performance of a particular liquid crystal material used in the cell.

In the field-free state, the director is uniformly aligned across the cell, making a large angle $\alpha$ (say, 45 degrees or other, as specified by the properties of the alignment layer) with the substrate plane as seen in FIG. 1A. Depending on the frequency of the applied voltage, the director reorients towards the homeotropic state, as seen in FIG. 1B or towards the planar state, as seen in FIG. 1C. When the reorientation into the new state is initiated by a special short pulse (SSP) or transition pulse of high amplitude and short duration (usually less than 1 ms), the reorientation can be significantly accelerated. One can optimize the SSP (transition pulse) to achieve a sub-millisecond response of the cell. The needed phase retardation in the cell is maintained by a holding voltage, that follows immediately after the SSP (transition pulse) and normally has an amplitude smaller than that of the SSP or transition pulse. When the phase retardation needs to be changed, another SSP (transition pulse) followed by another holding voltage pulse is applied, and the transition pulse and holding voltage pulse might be of the same or different frequency as compared to the frequency of the previous holding voltage pulse.

EXAMPLE I

Indium tin oxide (ITO) electrodes 14 were coated on glass substrates 12 that were cleaned in ultrasonic bath with detergent. The substrates 12 were initially cleaned by ozone stripping equipment. Oblique deposition of thin SiO layers (thickness 22 nm) were applied over the electrode coatings to achieve a high (about 42 degrees) pretilt angle between the director of the liquid crystal material and the substrate. Antiparallel assembly of the cells and glass spacers ensured a typical thickness of the LC layer to be about 10 μm. The cell 10 was filled with the dual-frequency nematic MLC2048 purchased from EM Industries, Hawthorne N.Y., with the basic parameters shown in Table 1. Using the data in Table 1, one can estimate the maximum phase retardation between the ordinary (refractive index $n_o$) and the extraordinary (refractive index $n_e$) beams that pass through the MLC-2048 cell as $$\Delta\varphi = \frac{2\pi}{\lambda} \cdot d \cdot (n_e - n_o) \approx 7\pi, \quad (5)$$

where d=10 μm is the thickness of the cell, and λ=0.633 μm is the He—Ne laser wavelength.

TABLE 1

Properties of MLC-2048 (by EM Industries Hawthorne NY).

| | | | | | |
|---|---|---|---|---|---|
| Temperature of nematic - isotropic transition | 106° C. | | | | |
| Optical anisotropy | $n_e$(20° C., 589 nm) | 1.7192 | | | |
| | $n_o$(20° C., 589 nm) | 1.4978 | | | |
| | Δn(20° C., 589 nm) | 0.2214 | | | |
| Frequency (kHz) | | 0.1 | 1.0 | 10 | 50 | 100 |
| Dielectric anisotropy (20° C.) | | 3.28 | 3.22 | 0.72 | −3.08 | −3.4 |

Figure 2:
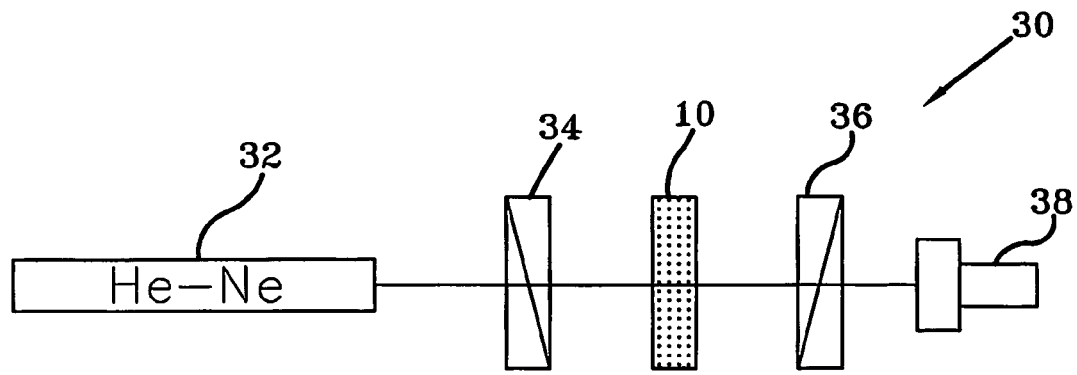
FIG. 2 is a schematic diagram of a test system which uses a liquid crystal cell according to the present invention.
Figure 3:
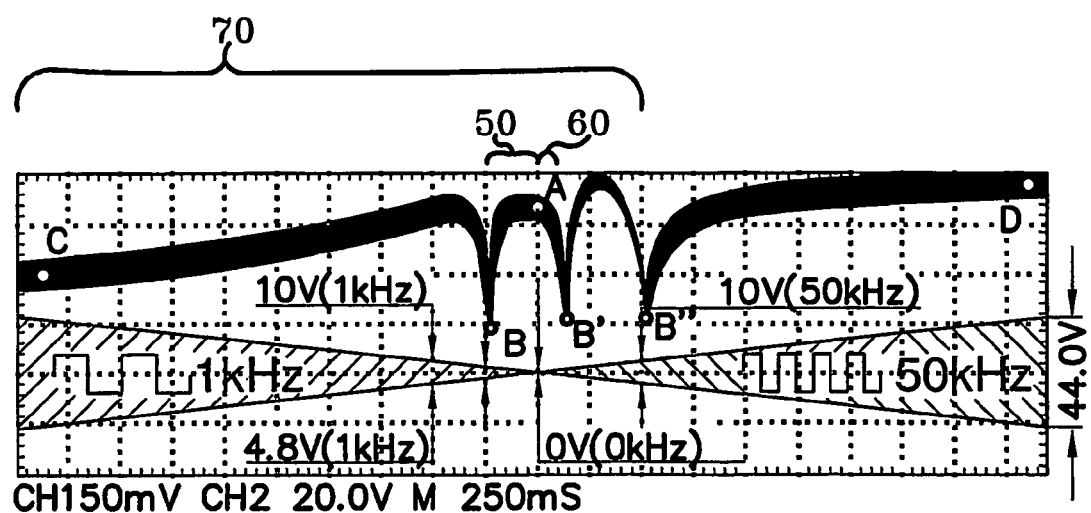
FIG. 3 is an optical transmission waveform measured by a photodetector as a function of an applied voltage; as measured for a liquid crystal cell prepared according to the present invention, example 1.

A computer-controlled waveform generator WFG 500 of FLC Electronics Inc. was used as the voltage supply 20 to modulate the transition and holding voltages. To visualize and measure the time evolution of the optical response of the cell, an optical set up, designated generally by the numeral 30 is shown in FIG. 2, with the cell 10 placed between two crossed polarizers in the configuration of a polarizer 34 and an analyzer 36. A He—Ne laser (633 nm) 32 generates an impingent light that is normal to the cell 10. The projection of the director onto the cell plates makes an angle 45° with the polarizer and the analyzer. For this optical setup 30, the intensity I of the transmitted light depends on the phase retardation $$I(\Delta\varphi) = I_0 \sin^2 \frac{\Delta\varphi}{2}, \quad (6)$$

where $I_0$ is the intensity of incident light (small corrections due to the reflection of light at interfaces, scattering at director fluctuations, etc. are neglected). A photodetector 38 is positioned on the side of the crossed polarizers opposite the laser 32 for detecting phase shift changes. The photodetector 38 is coupled to a digital oscilloscope such as a Tektroix TDS210 to generate images of the detected light FIG. 3 shows the signal of photodetector 38 (top trace), as the function of the amplitude and the frequency of the applied voltage (bottom trace). The variation of photodetector signal between two minima (for example, between points B and B' in FIG. 3) corresponds to the phase shift Δϕ=2π. The total phase change of the cell 10 is Δϕ≈7π when the voltage applied to the cell 10 is fixed at 44V and its frequency changes from 1 kHz to 50 kHz.

Figure 4:
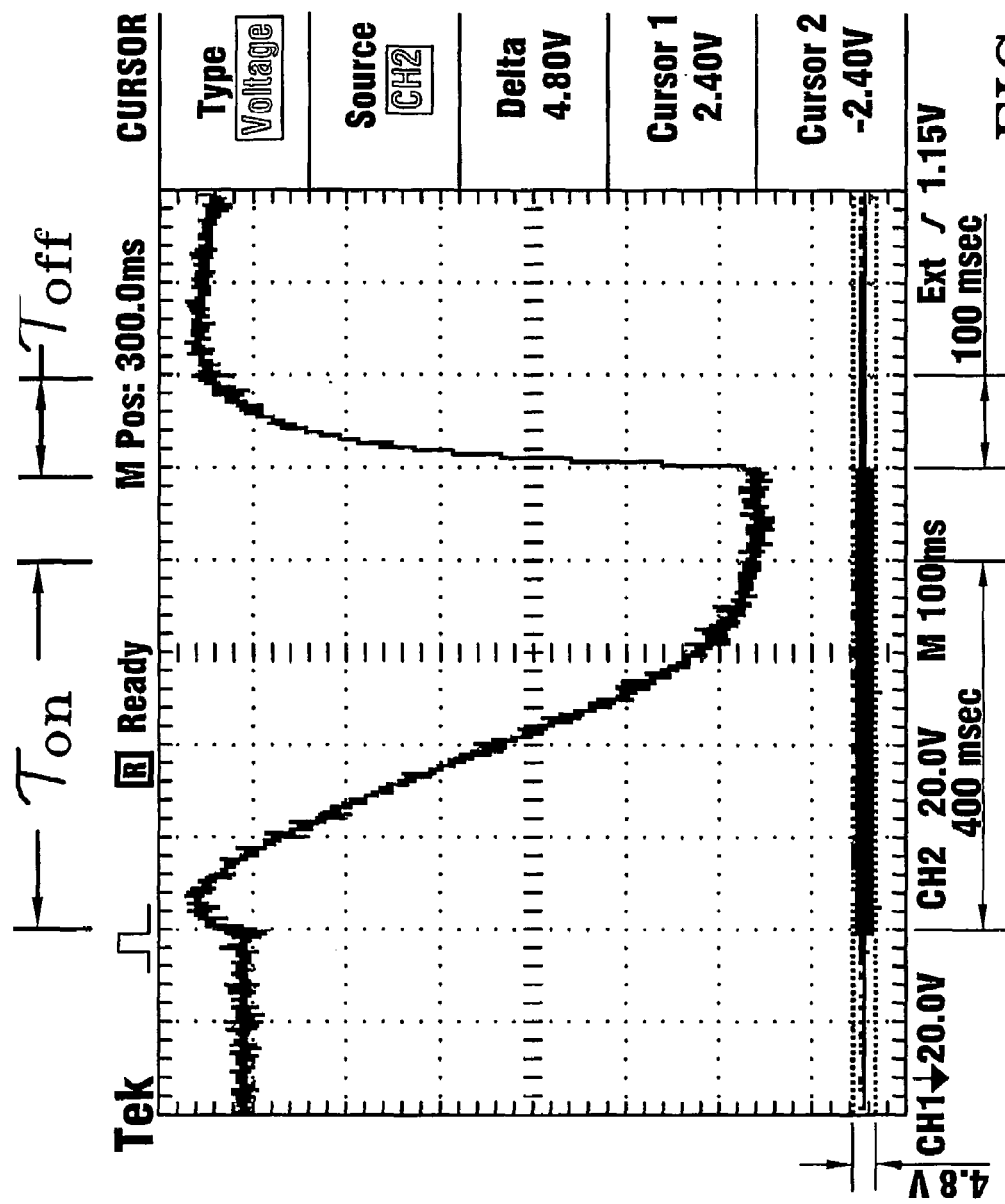
FIG. 4 is a measured optical response of a prior art liquid crystal cell.

It can also be demonstrated how the shape of the driving voltage influences the dynamics of the measured optical response of cell 10. For example, one may consider a transition 50 between points A and B in FIG. 3. This transition corresponds to the phase shift Δϕ≈π. If the transition is caused by a voltage pulse of constant amplitude 4.8 V and frequency 1 kHz, the response time is very large: $\tau_{on}$≈0.4 s and $\tau_{off}$≈0.1 s (see FIG. 4). It has been found that the response times can be significantly reduced by using a modulated voltage addressing with incorporated SSPs or transition pulses, as explained below.

Figure 5A:
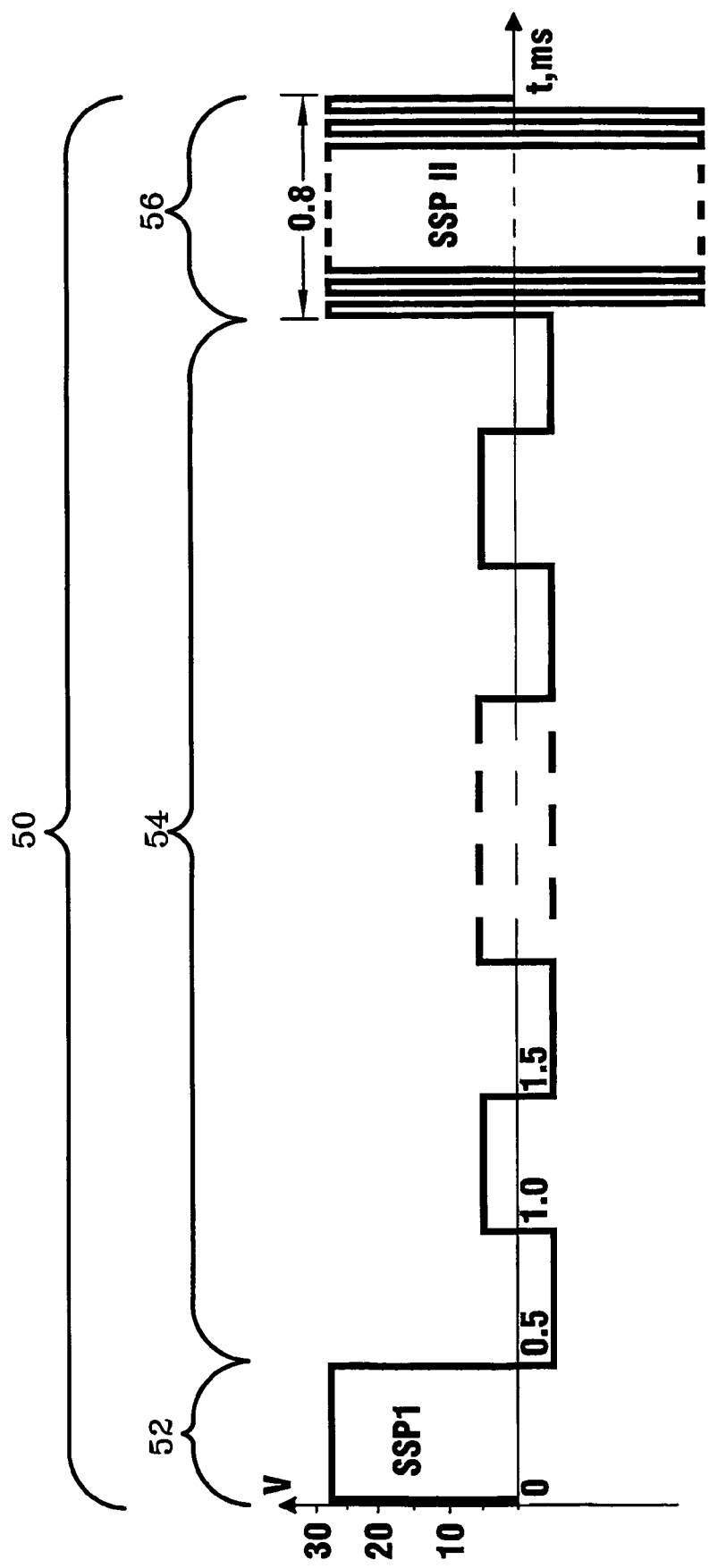
FIG. 5A is a transition voltage waveform from points A→B→A, as seen in FIG. 3, triggered by two transition pulses.

To reduce the response time of the transition 50 between points A and B, a special short pulse (SSP) was applied every time the frequency or amplitude of the driving voltage was changed. An example of the applied voltage profile with two SSPs is presented in FIG. 5A. The first SSP 52 (duration 0.5 ms, amplitude 28V, frequency 1 kHz) produces fast reorientation to the state B, which is closer to the homeotropic configuration than the initial state A. A square-wave holding voltage 54 of 4.8V at 1 kHz follows to maintain the state B. The B state is switched into the initial A state by a second SSP (duration 0.8 ms, amplitude 20V, frequency 50 kHz) 56; the amplitude of the holding voltage in this particular example for the state A is zero.

Figure 5B:
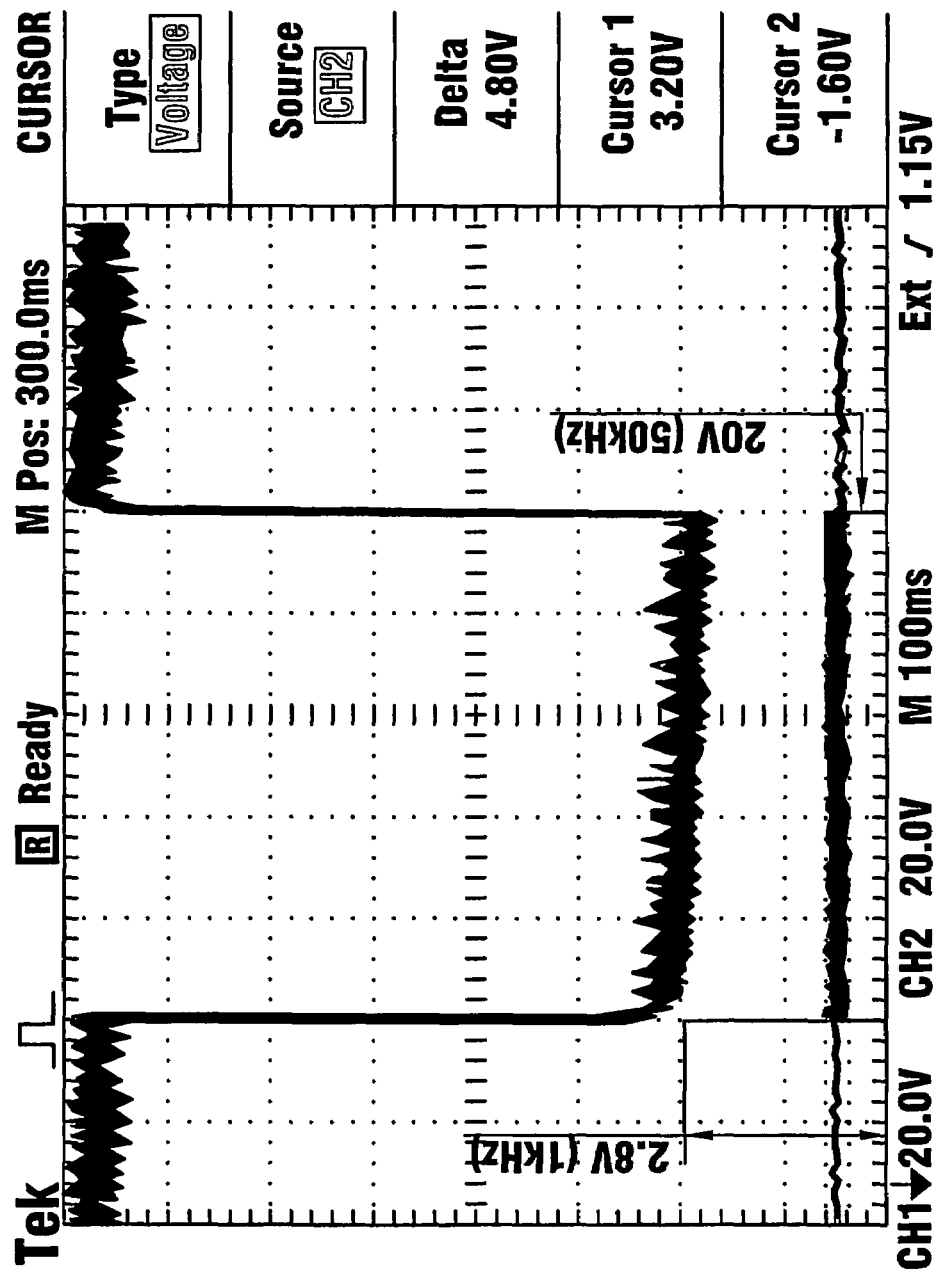
FIG. 5B is a measured optical response signal measured by a photodetector observing the transition voltage pulses shown in FIG. 5A.
Figure 6A:
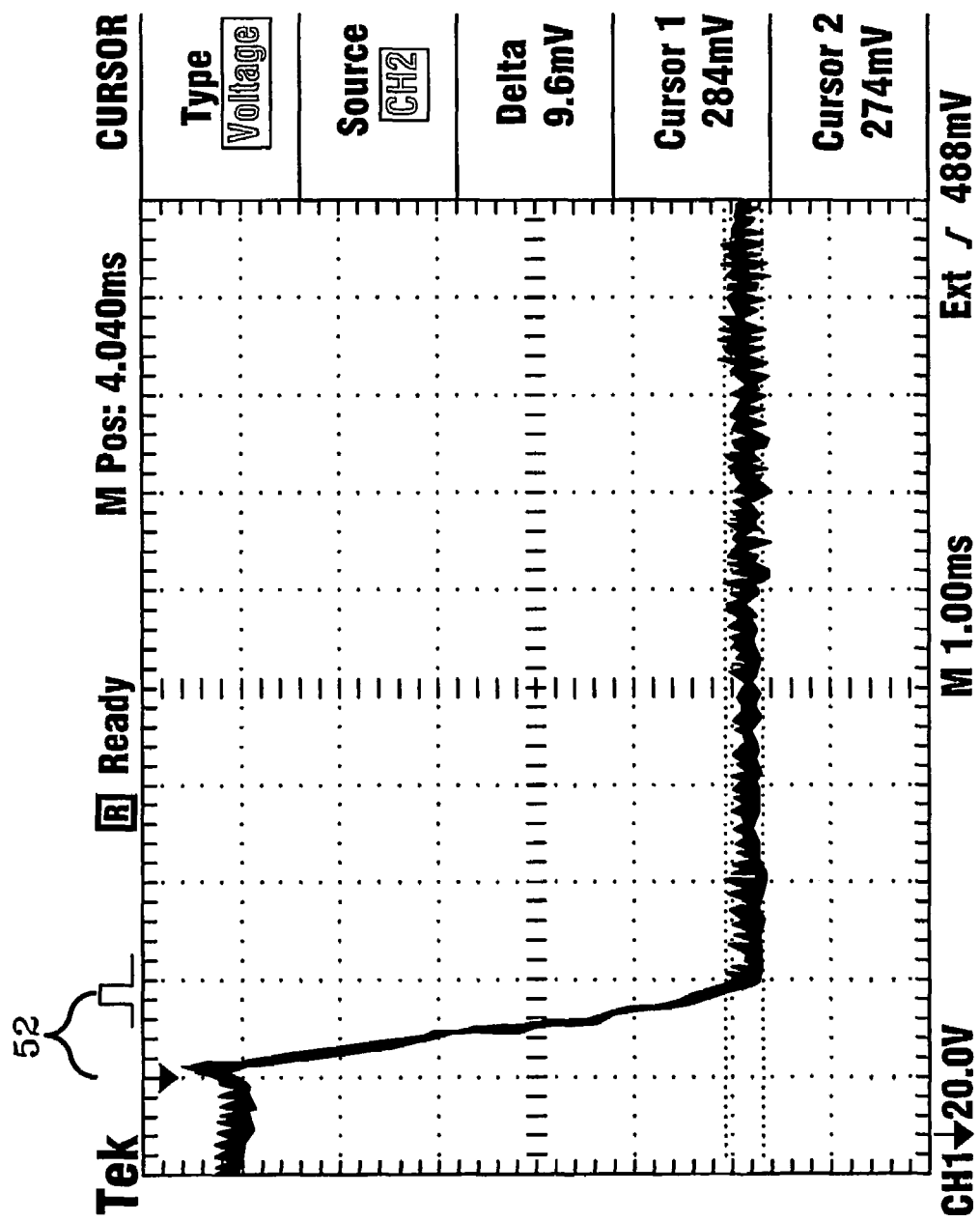
FIG. 6A is an enlarged version of FIG. 5B detailing the A→B transition.
Figure 6B:
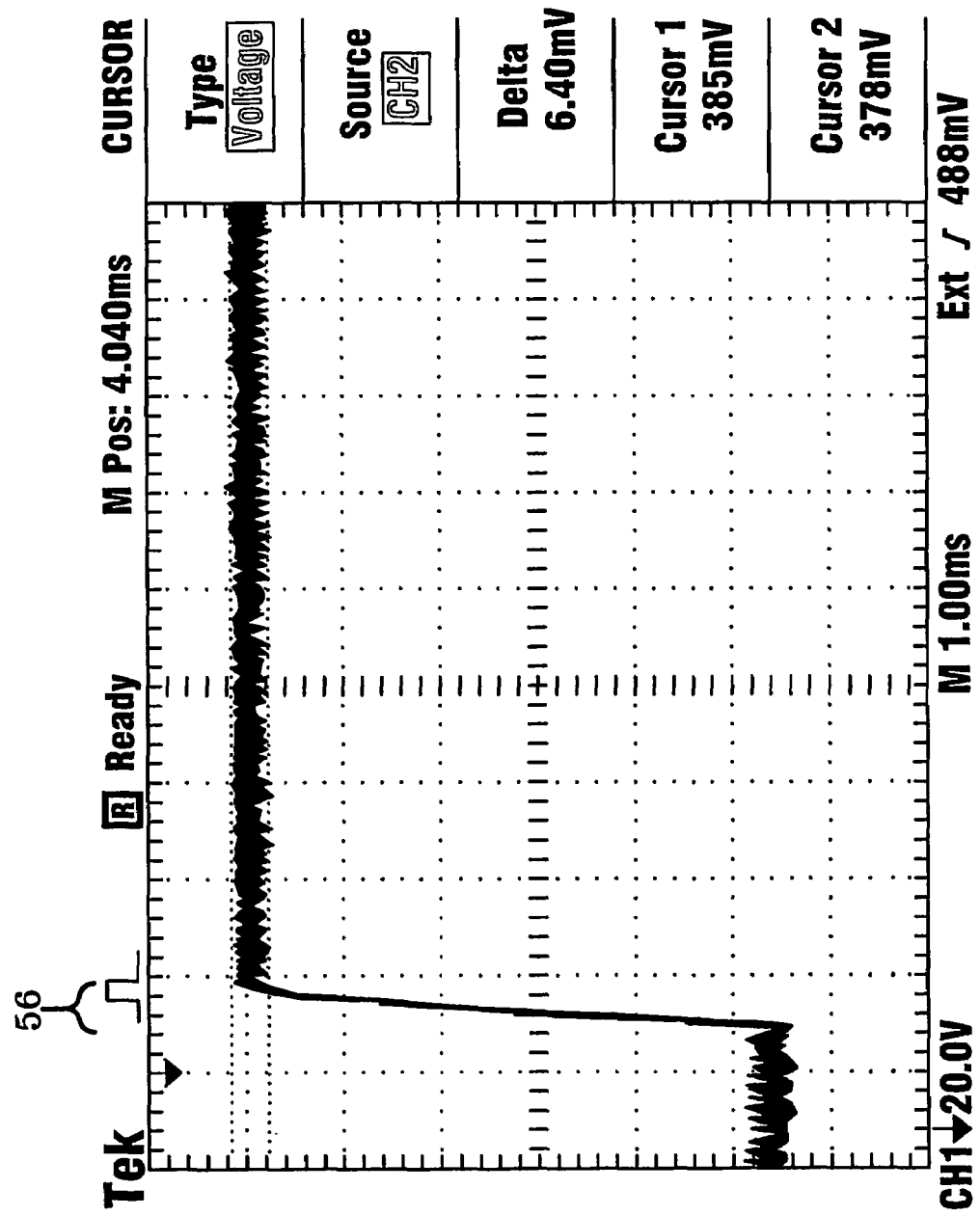
FIG. 6B is an enlarged version of FIG. 5B detailing the B→A transition.

FIG. 5B and its magnified versions in FIGS. 6A and 6B show that the transition times for both A→B and B→A transitions can be reduced to the sub-millisecond level by using two different SSPs.

Figure 7A:
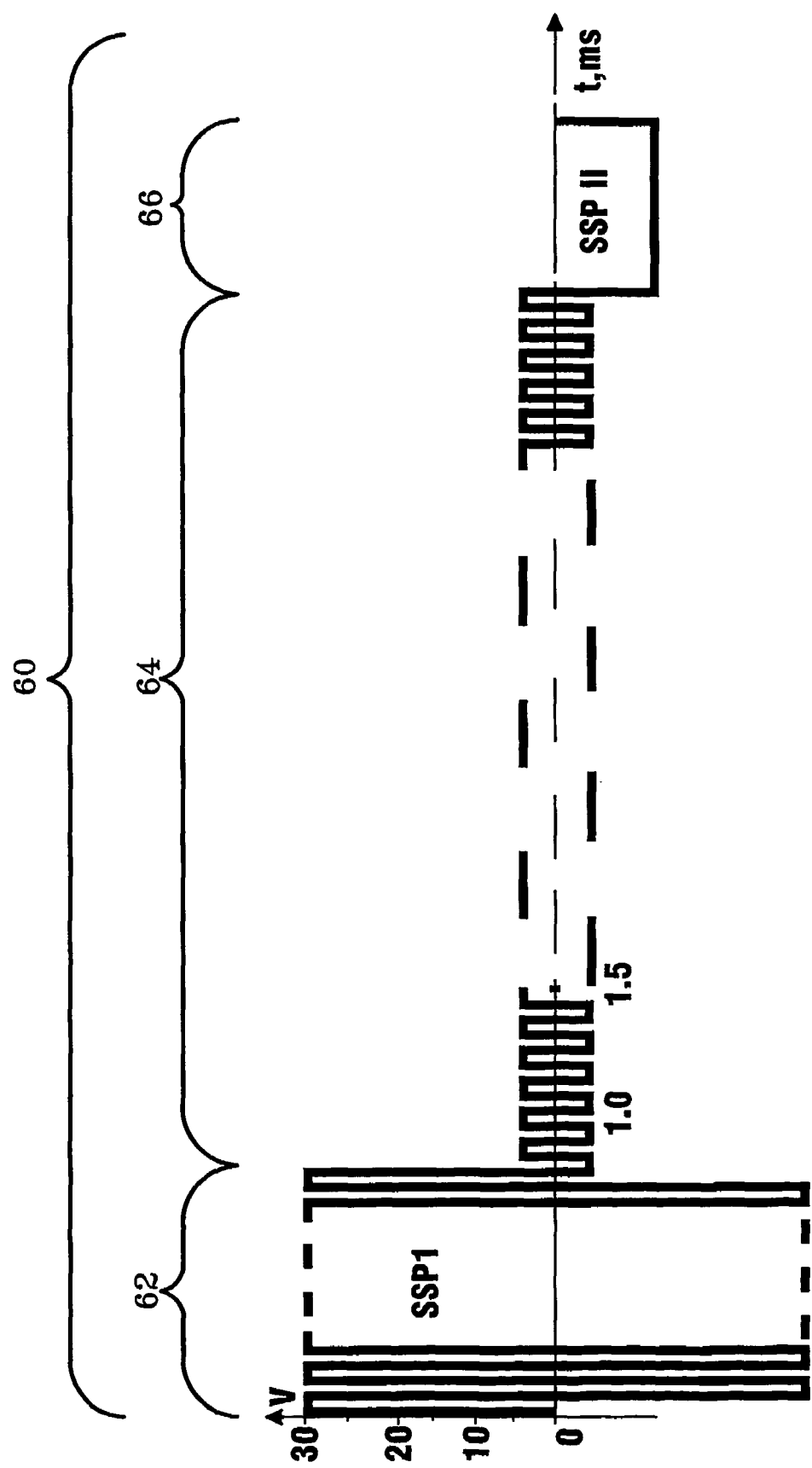
FIG. 7A is a transition voltage waveform from points A→B'→A, as seen in FIG. 3, triggered by two transition pulses.
Figure 7B:
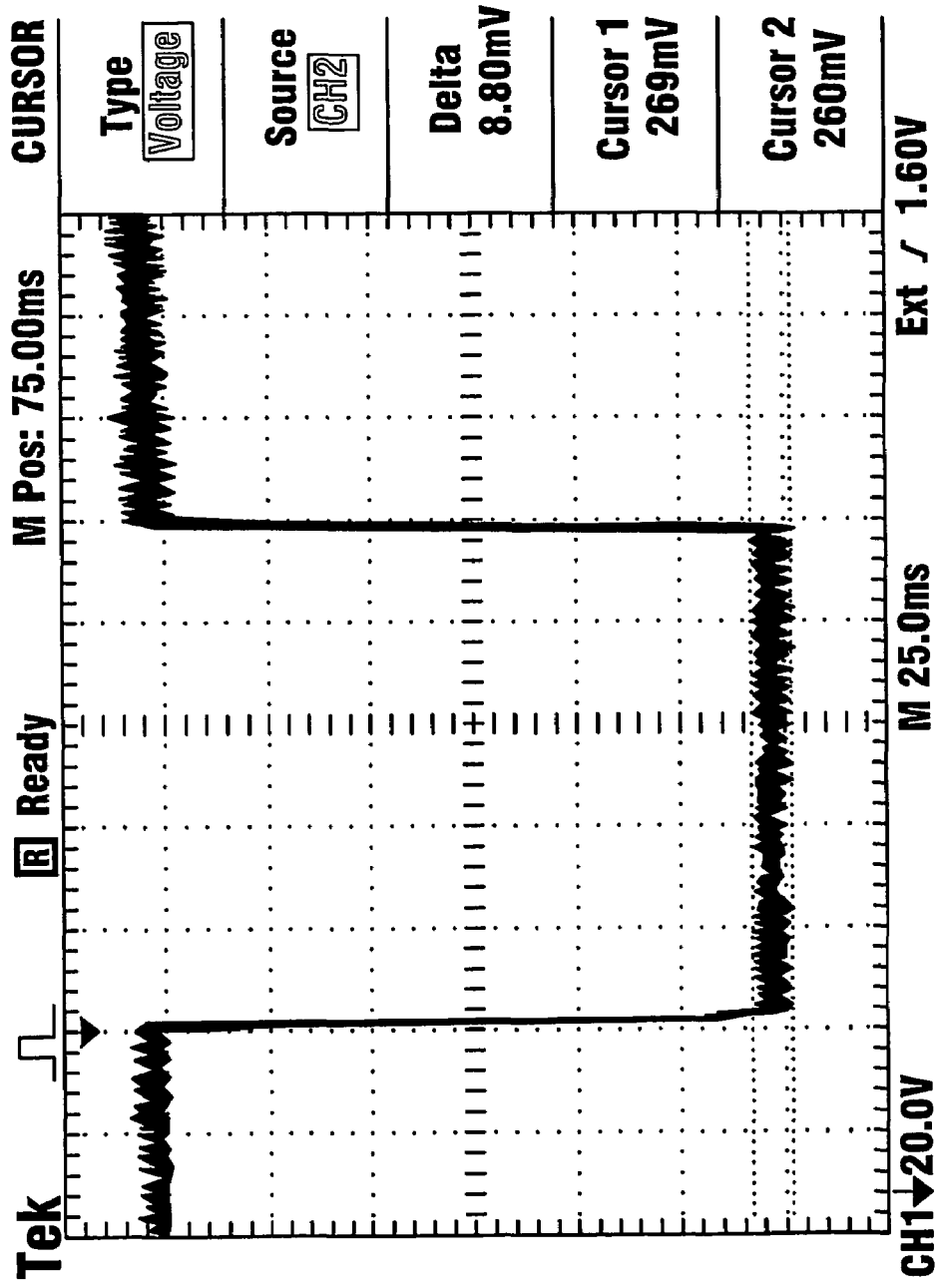
FIG. 7B is the optical response measured by the photodetector D of the transitions shown in FIG. 7A.

As seen in FIG. 7, a similar fast switching transition 60 can be achieved between the states A and B' (see FIG. 3). The B'-state is closer to the planar state than the A state and is maintained by 50 kHz voltage. Here again, the holding voltages are separated by is high-magnitude short-duration SSPs. In particular, a transition driving pulse 62 of about 28 volts and having a frequency of about 50 kHz is applied to drive the material from an initial tilted state to a homeotropic state in about 0.8 ms. A holding pulse 64 is then applied to the material to maintain the homeotropic texture for a desired period of time. When the material needs to be switched from the homeotropic texture to the initial tilted state, a transition pulse 66 is applied for approximately 0.5 ms. and the material returns to its initial state.

Figure 8A:
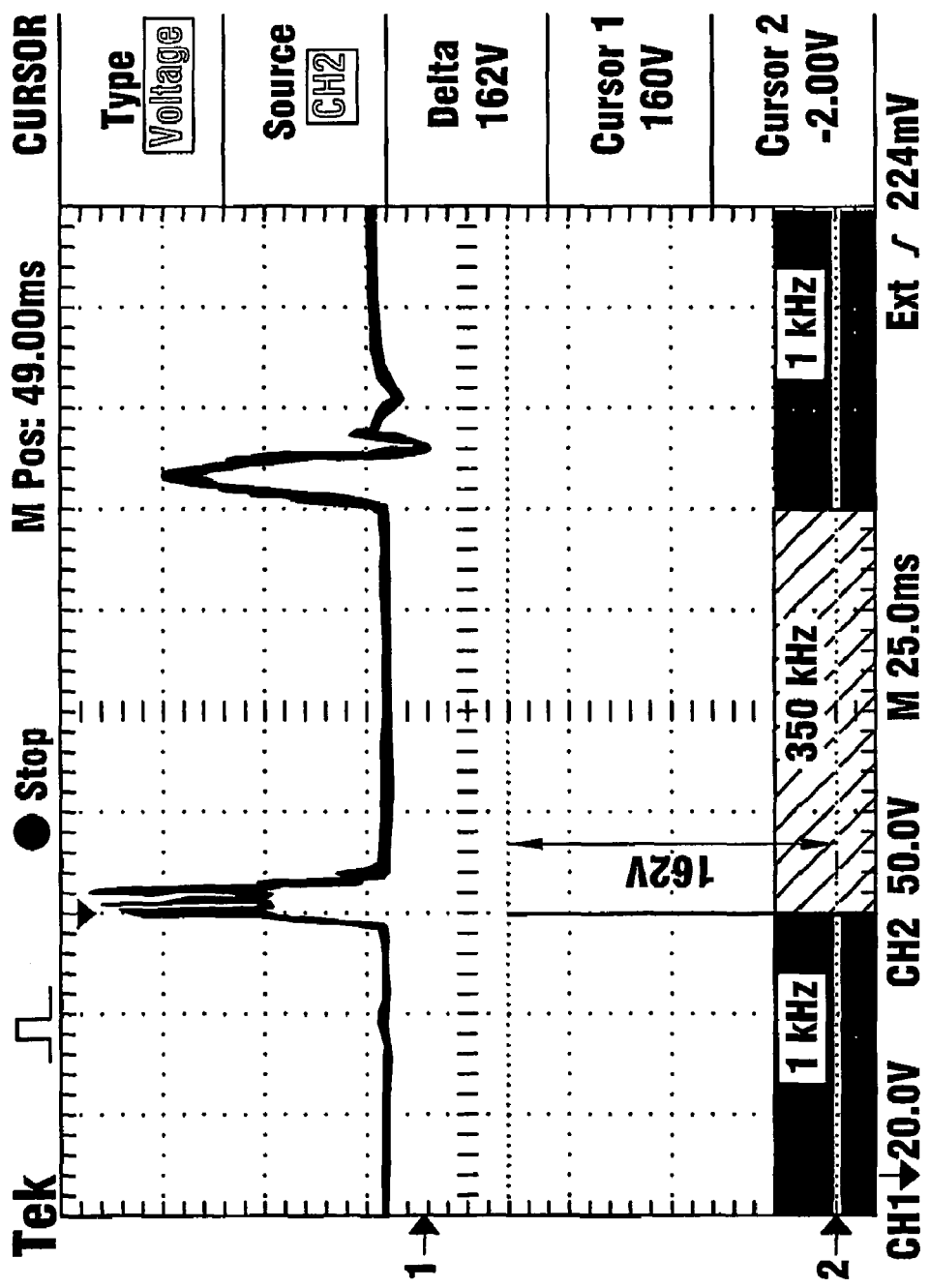
Figure 8B:
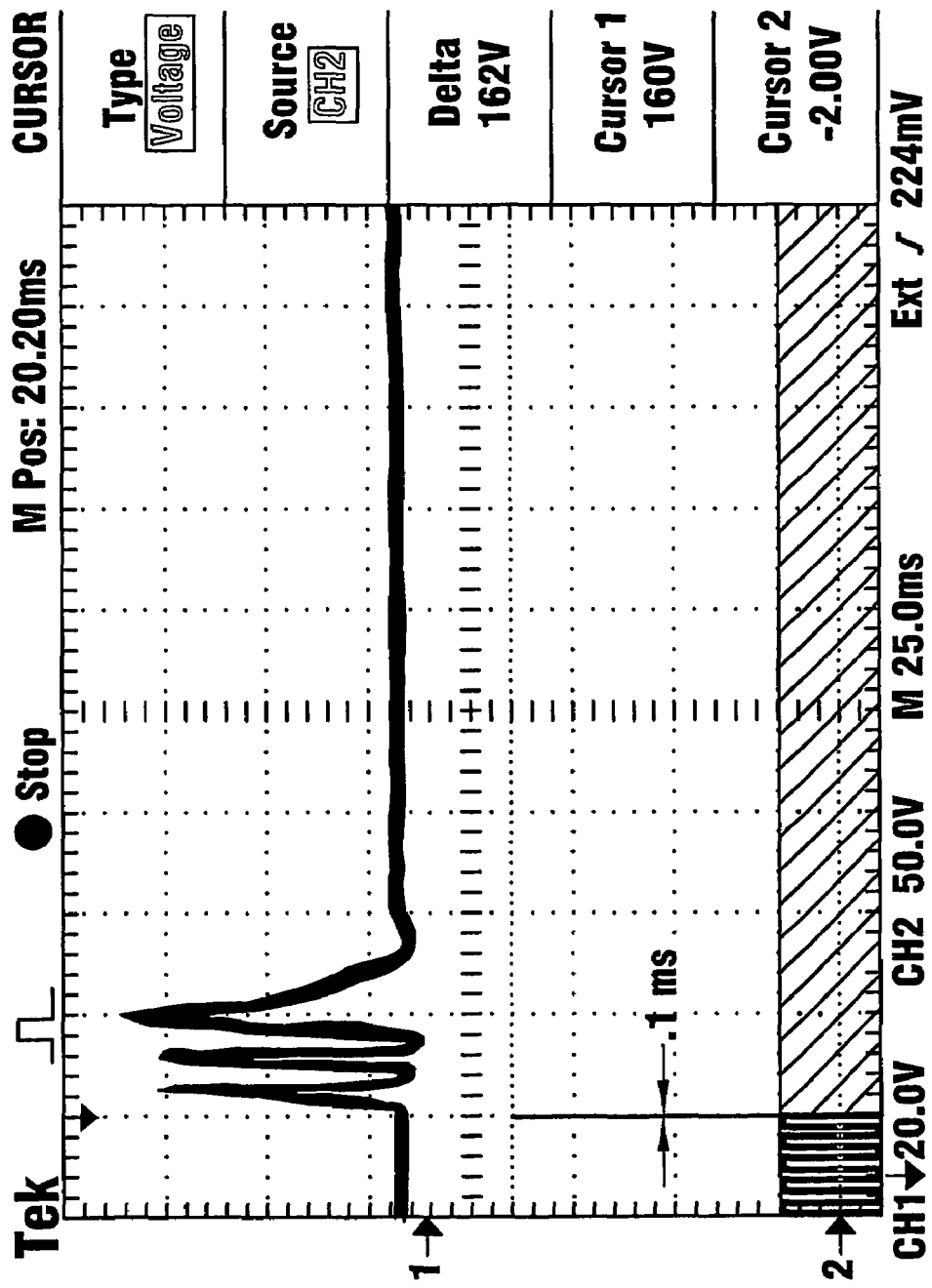
FIG. 8B shows the same transition in a 5 ms/square times scale.

FIG. 8A shows the signal of photodetector D for the phase shift by 6π, which corresponds to a transition 70, designated as C→B" in FIG. 3. To compare the switching times, the SSP or transition pulse of frequency 50 kHz and amplitude 162 volts was used during the transition C→B" but not for the backward transition B"→C. The time of the C→B"'transition was less then 10 ms and the time of the transition B"→C was longer, about 25 ms.

In these experiments, it has been observed that sometimes the transitions between different states are accompanied by a variation of the optical signal that develops over long periods of time (hundreds of milliseconds); however, the deviations are relatively small, 10% or less of the total amplitude of the signal.

In the description above, only one adjusting parameter, the amplitude of SSPs at two different frequencies, was used. However, one can also use many other available parameters to further optimize the cell response, such as duration, frequency and profile of SSPs and holding voltage pulses, surface anchoring strength, viscoelastic, optical and dielectric constants of the liquid crystal material, etc.

EXAMPLE II

Indium tin oxide (ITO) coated glass substrates were cleaned in ultrasonic bath with detergent. The substrates were cleaned by ozone stripping equipment An oblique deposition of thin SiO layers (thickness 22 nm) was used to achieve a high (42 degrees) pretilt angle between the director and the substrate. Anti-parallel assembly of the cells and glass spacers was used to ensure a typical thickness of the LC layer to be 12 μm. The cells were filled with the dual-frequency nematic MLC2048 purchased from EM Industries, Hawthorne N.Y., with the basic parameters shown in Table 1. Using the data in Table 1, one can estimate the maximum optical retardation between the ordinary (refractive index $n_o$) and the extraordinary (refractive index $n_e$) beams that pass through the MLC-2048 cell as:

$$\Delta L_{max} = d \cdot (n_e - n_o) \approx 2.66 \; (\mu m), \quad (7)$$

where d=12 μm is the thickness of the cell.

To further improve the conditions of fast optical retardation switching, in addition to applying the amplitude and frequency modulated voltage, one can also optimize the temperature of operation of the dual frequency nematic cell by maintaining a specified temperature around the cell such as with the temperature regulator 22. Since the viscosity of the liquid crystals is generally lower at higher temperatures, it is believed that even faster response time can be achieved at elevated temperatures.

Figure 9:
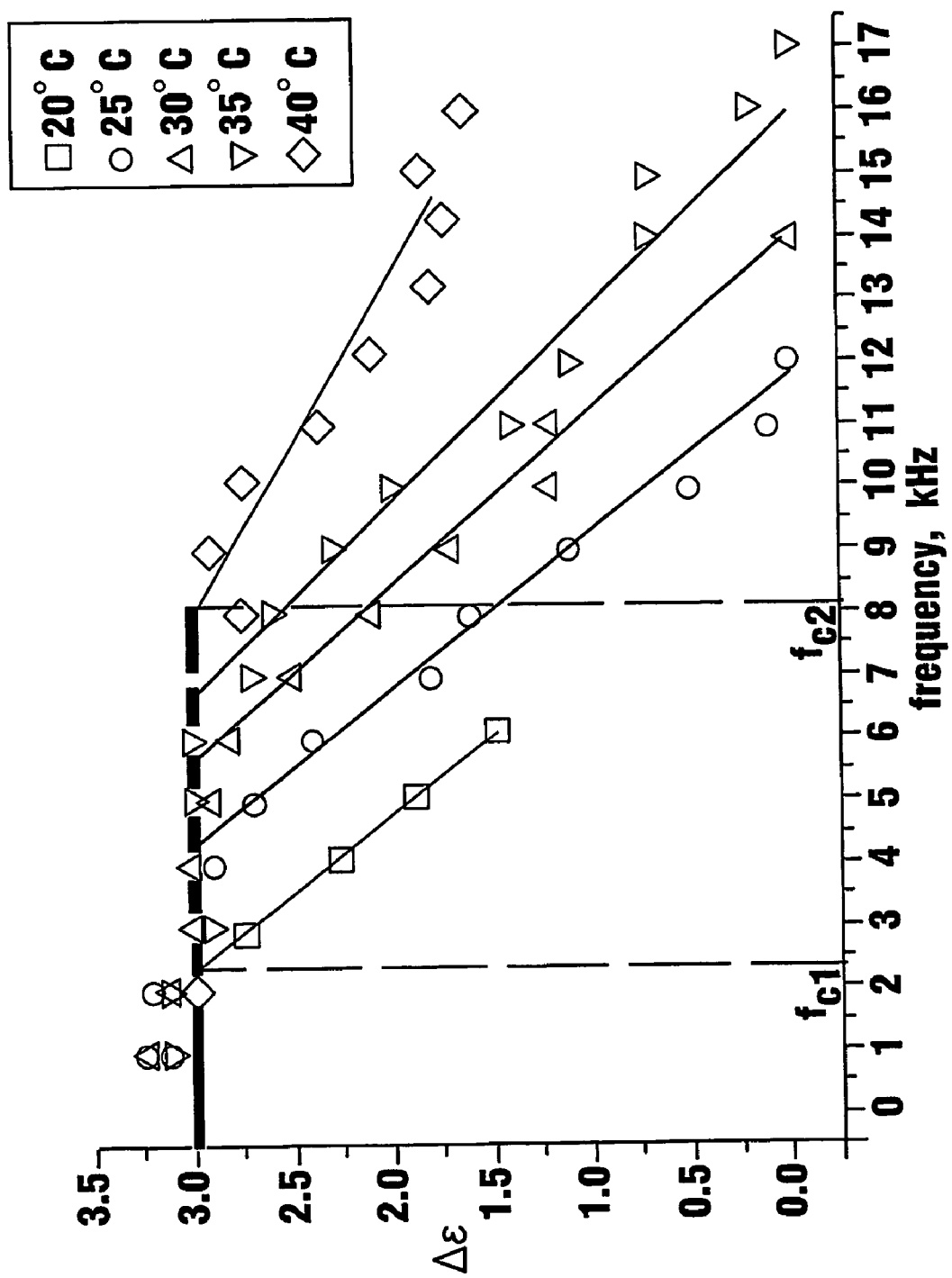
FIG. 9 is a graphical representation of the dielectric anisotropy of a dual-frequency liquid crystal material versus frequency of the applied voltage at different temperature values.

There are three important factors to consider when selecting the best temperature (or temperature range) of operation. First, the rotational viscosity of the nematic LC usually has activational temperature dependence:

$$\gamma_1 \sim S \cdot \exp\left(\frac{E'}{k_B T}\right), \quad (8)$$

where S is the order parameter, E' is the energy of activation (of the order of $10^{-19}$ J for a typical thermotropic liquid crystal), $k_B$ is the Boltzmann constant and T is the temperature of a nematic cell. There is no readily available data on E' for MLC2048, but the higher temperature must decrease the rotational viscosity, and therefore the switching time of nematic cell, see (Eq.(3). Second, the dispersion of dielectric anisotropy in dual frequency materials strongly depends on temperature. FIG. 9 shows the dependence of dielectric anisotropy $\Delta \in$ on the frequency of the applied voltage under different temperatures. For example, the variation of the cell temperature between 25 and 35° C. shifts the frequency $f_{\Delta \in = 0}$ from 12 to 17 kHz and shifts the critical frequency $f_c$ after which the value of $\Delta \in$ decreases significantly. Finally, the temperature increase may decrease the optical birefringence. However, the temperature variation from 20° C. to 32° C. does not change significantly the maximum phase retardation of the nematic cell with MLC2048. To confirm this fact, the optical setup 30, shown in FIG. 2 was employed with the cell of this experiment placed between two crossed polarizers (the rubbing direction makes 45° with both polarizer 34 and analyzer 36. To detect transmitted light, the silicon photodiode 38 and digital oscilloscope Tektronix TDS210.

Figure 10A:
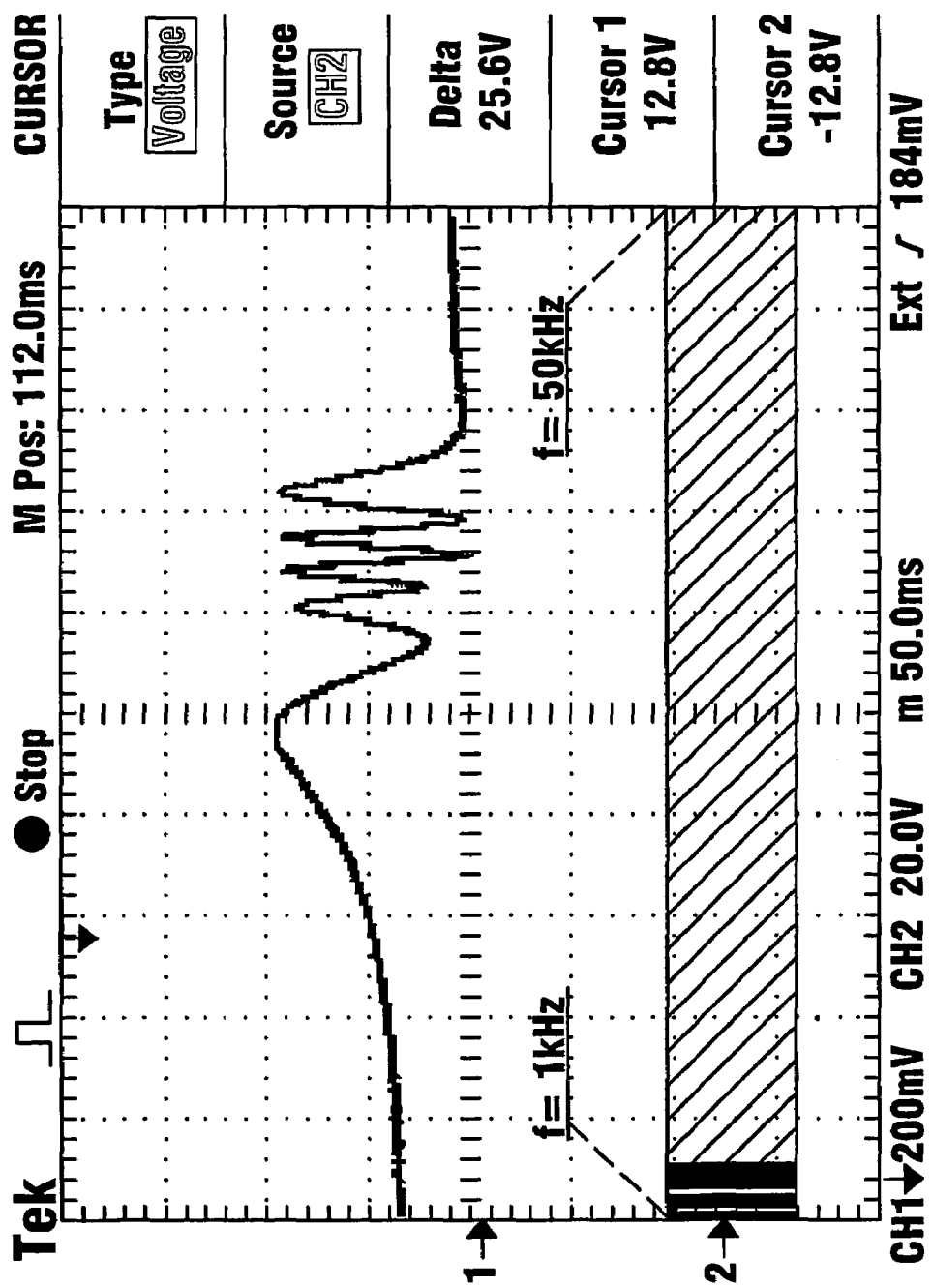
FIGS. 10A and B are exemplary phase retardations of a 12 μm thick dual frequency nematic cell as a function of sweeping frequency of the applied voltage and temperature, wherein the temperature of the observed cell in FIG. 10A is 20° C. and the temperature of the observed cell in FIG. 10B is 32° C.
Figure 10B:
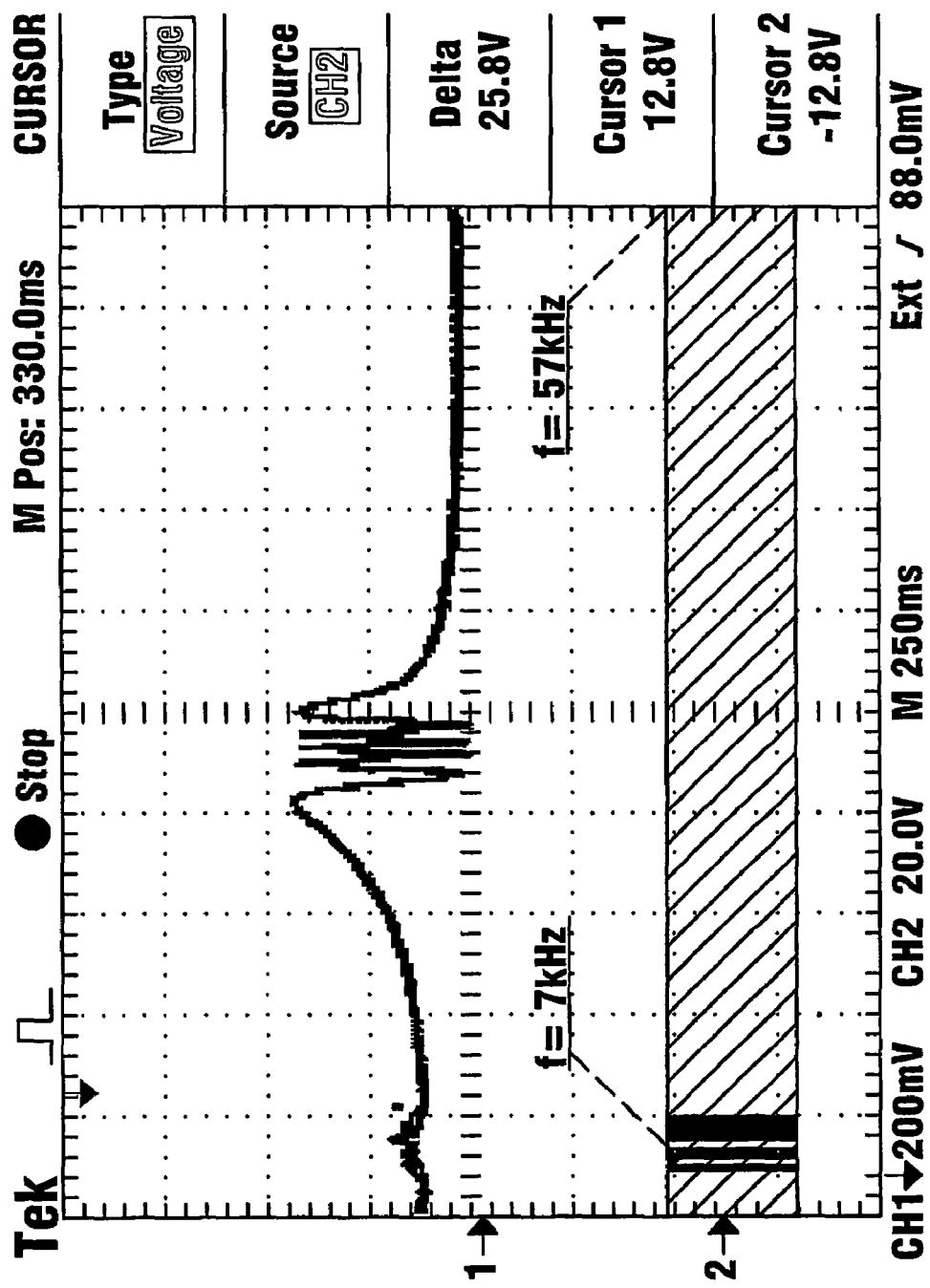

FIGS. 10A and 10B show oscilloscope pictures of a transmitted signal (top trace) from the photodiode of the optical setup as the function of the frequency of the applied voltage (the bottom trace). A computer-controlled waveform generator WFG 500 of FLC Electronics Inc. was used to generate the driving voltage. For this optical setup, the intensity I of the transmitted light depends on the phase retardation as shown in Equation 6 where $I_0$ is the intensity of incident light (small corrections due to the reflection of light at interfaces, scattering at director fluctuations, etc. were neglected), and $$\Delta \varphi = \frac{2\pi}{\lambda} \Delta L$$

is the phase shift of transmitted light. The variation of the photodiode signal between two minimums corresponds to the phase shift on $\Delta \phi = 2\pi$, where optical retardation is $\Delta L = \lambda$. For example, FIG. 10A shows the transition between homeotropic and planar states by the sweeping frequency of applied voltage with the permanent amplitude 25.6 V under 20°C. The heating of the cell up to 32° C. shifts the transition signal of the nematic cell to the higher frequency region under applied voltage with the same amplitude (FIG. 10B). Both oscilloscope pictures show the same amplitude of maximum optical retardation $\Delta L_{max} = 2.66$ μm.

In the next example, the temperature of the circulating heating fluid (water) was fixed at 32° C. A water circulator unit with temperature controller (model No. 1104 VWR Scientific purchased from PolyScience, Nile, Ill. 60714) was used to pump water through a closed loop, that included thermoinsulated plastic tubes and a closed external aluminum block that served as the sample holder. This stabilized the temperature of the nematic cell with the precision ±0.1 degree. At this temperature the dual frequency nematic cell utilized a low frequency driven voltage set at a carrier frequency of 7 kHz, and the high frequency driven voltage was set at 50 kHz.

Figure 11:
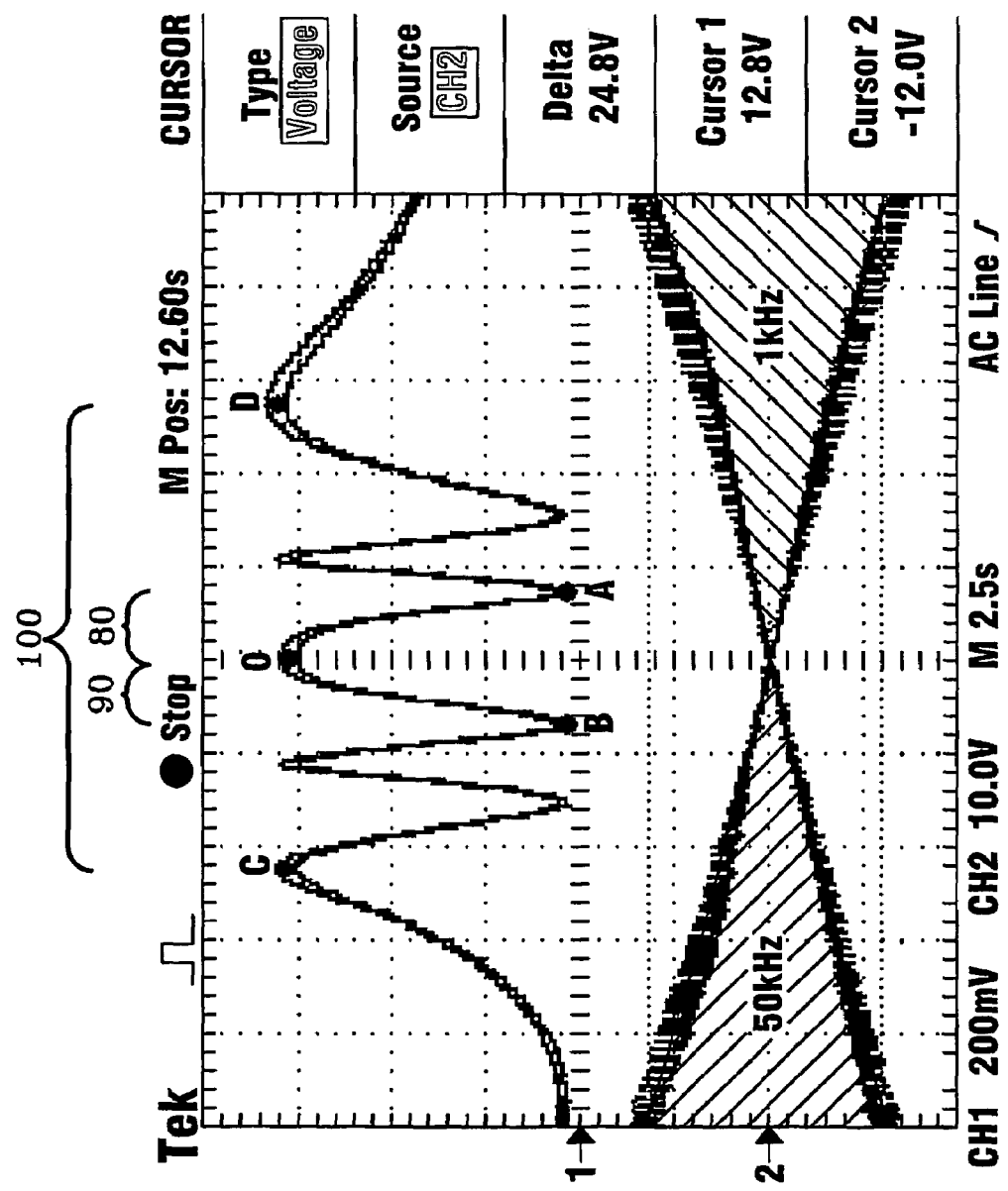
FIG. 11 is a measured optical transmission (top trace) measured by a photodetector as a function of applied voltage (bottom trace) at 1 kHz on the left side of the voltage trace and 50 kHz on the right side of the voltage trace.

To measure the time evolution of the optical response of the cell, the optical setup shown in FIG. 2 with the cell placed between two crossed polarizer prisms was used. FIG. 11 shows the signal of photodiode 38 (top trace), as the function of the amplitude and the frequency of the applied voltage (bottom trace). The variation of photodiode signal corresponds to nematic cell reorientation from the planar to the homeotropic state, when the applied voltage is changed between 25V at 50 kHz, 0V and 25V at 1 kHz.

As can be seen in the following FIGS.., the shape of the driving voltage influences the dynamics of the measured optical response of cells. For example, the transition between points O and A designated by the numeral 80 in FIG. 11 which corresponds to the optical retardation switching $\Delta L = \lambda/2 = 0.3$ μm. As in the previous example, the transition is caused by a voltage pulse of constant amplitude 4.8 V and frequency 1 kHz, the response time is very long: $\tau_{on} \approx 0.4$ s and $\tau_{off} \approx 0.1$ s (see FIG. 4.).

Figure 12A:
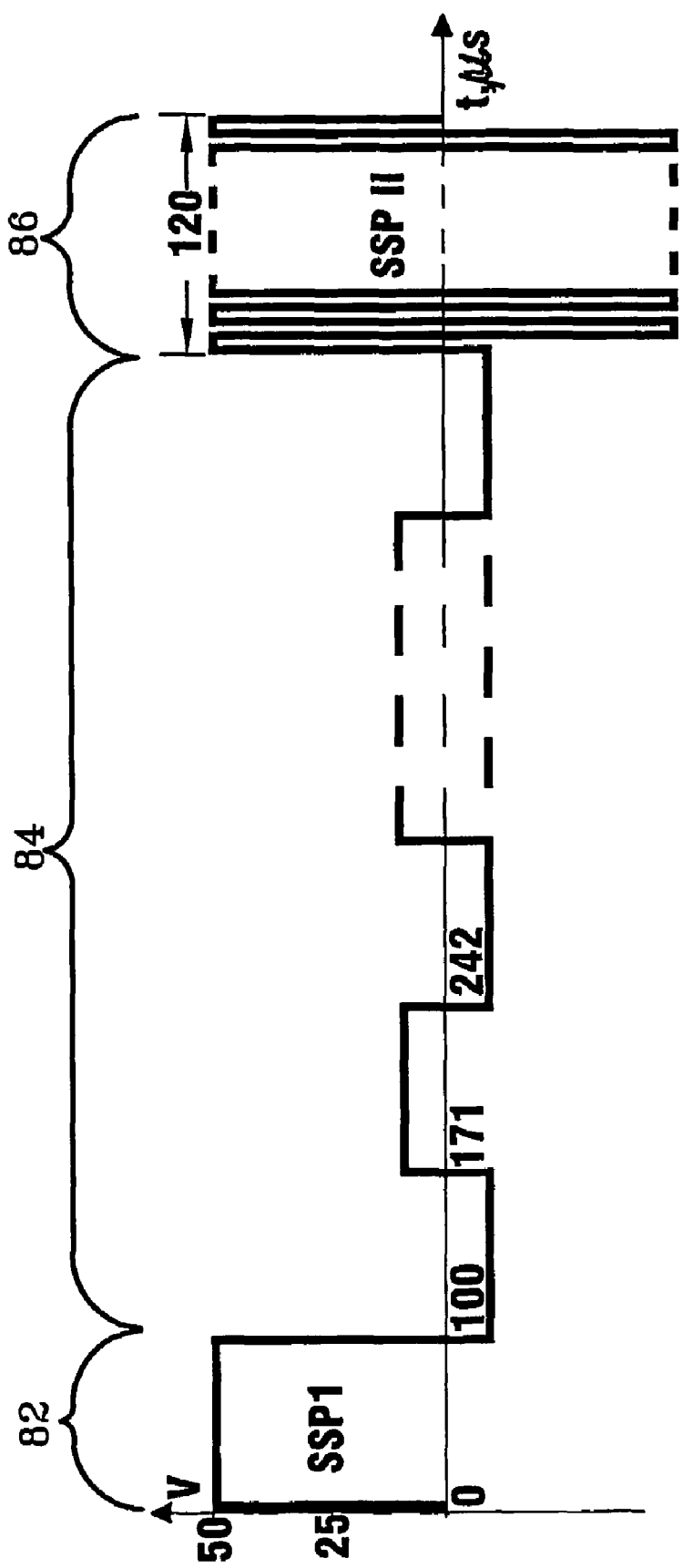
Figure 12B:
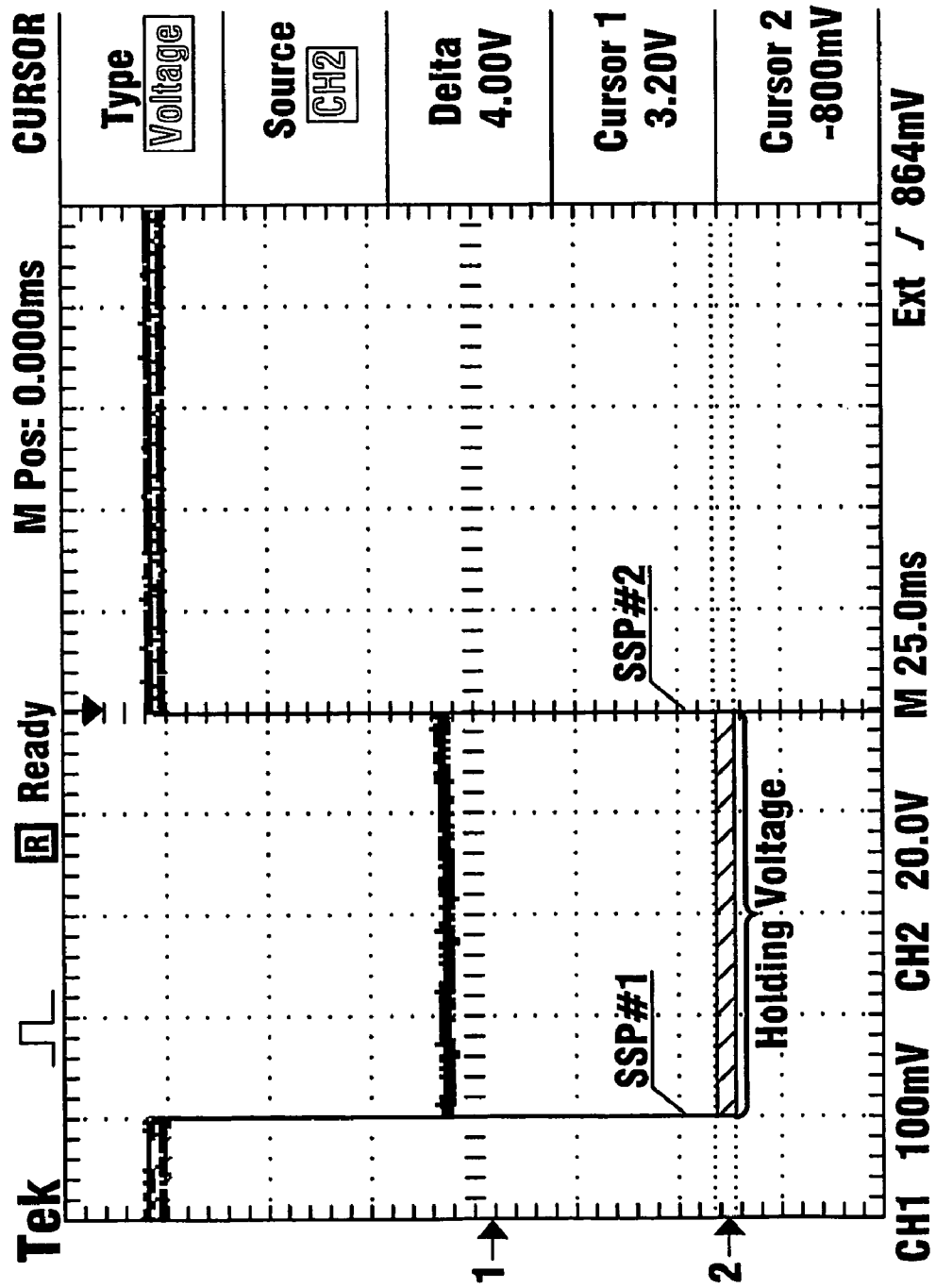
FIG. 12B shows the entire waveform of the O→A→O transition.
Figure 12C:
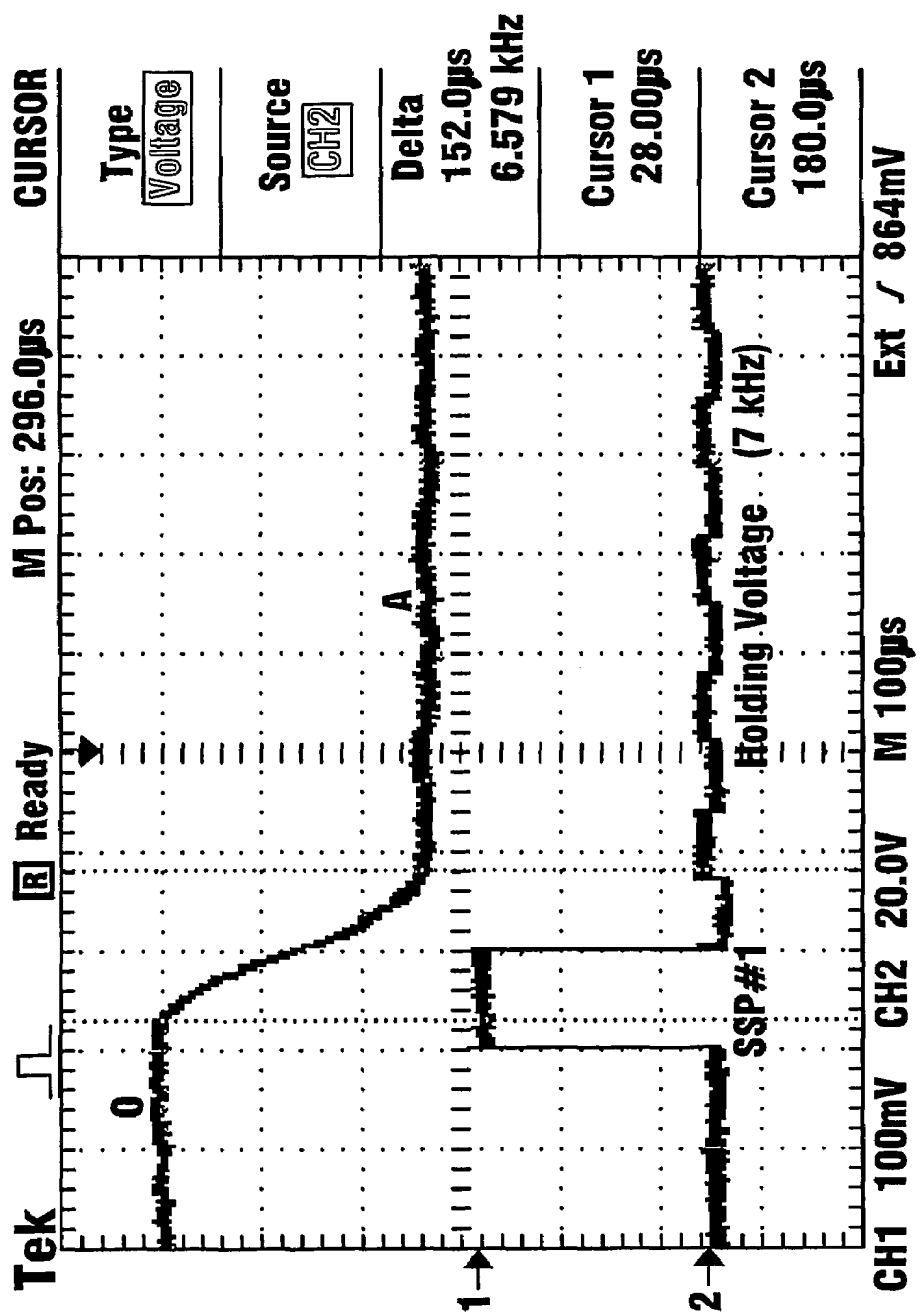
FIG. 12C illustrates the O→A transition.
Figure 12D:
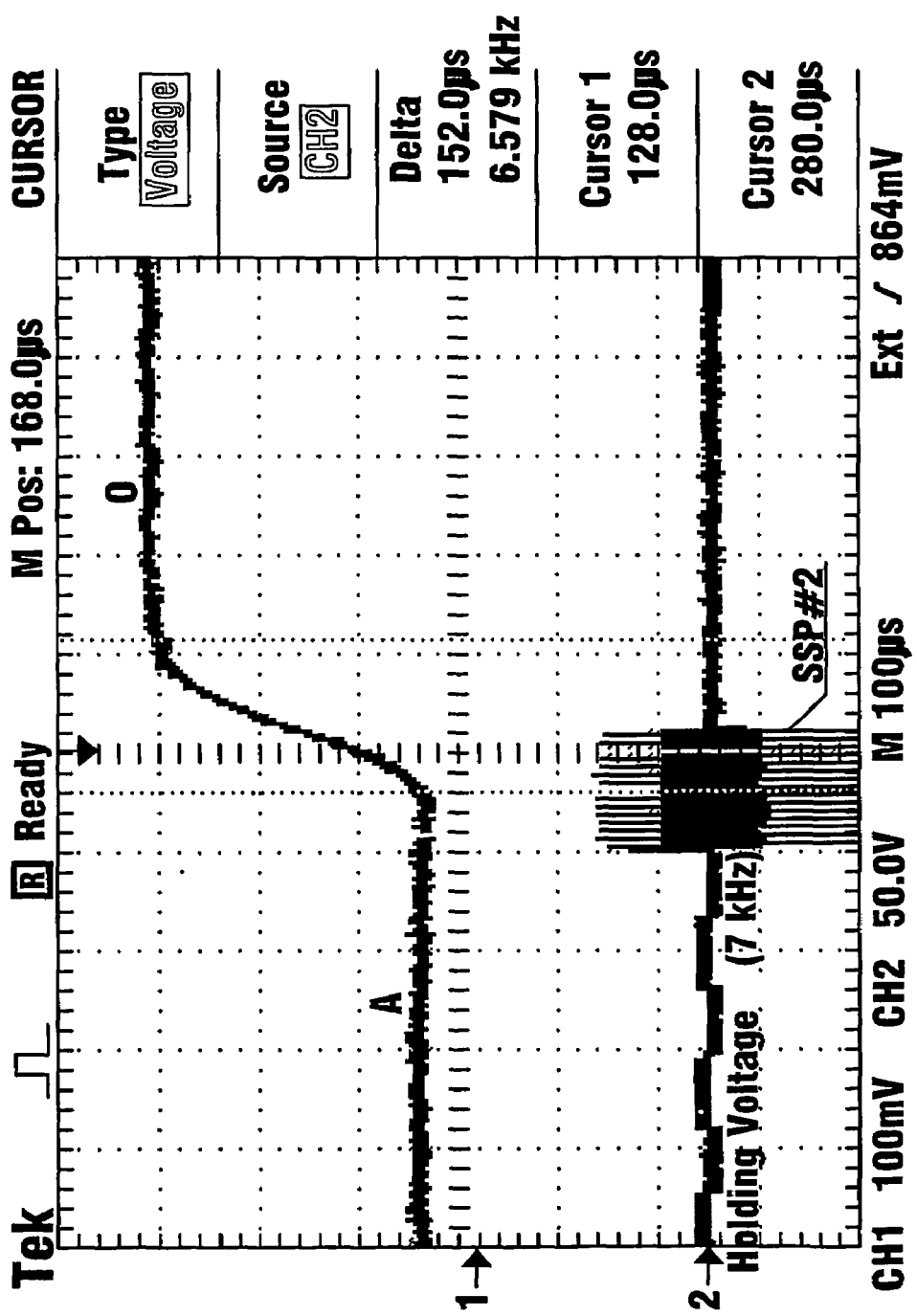
FIG. 12D illustrates the A→O transition.

To reduce the response time of the transition 80 between points O and A, a special short pulse (SSP) or transition pulse was applied every time the frequency or amplitude of the driving voltage was changed. An example of the applied voltage profile with two SSPs is presented in FIG. 12A. The first SSP (duration 0.1 ms, amplitude 50V) or transition pulse 82 produces fast reorientation to the state A, which is closer to the homeotropic configuration than the initial state O. A square-wave holding voltage pulse 84 of 4.8V at 7 kHz follows to maintain the state A. The A state is switched into the initial O state by a second SSP (duration 0.12 ms, amplitude 50V, frequency 50 kHz) or transition pulse 86; the amplitude of the holding voltage in this particular example for the state O is zero. FIG. 12B and its magnified versions FIGS. 12C, and 12D show that the transition times for both O→A and A→O transitions can be reduced to the sub-millisecond level by using two different SSPs.

Figure 13A:
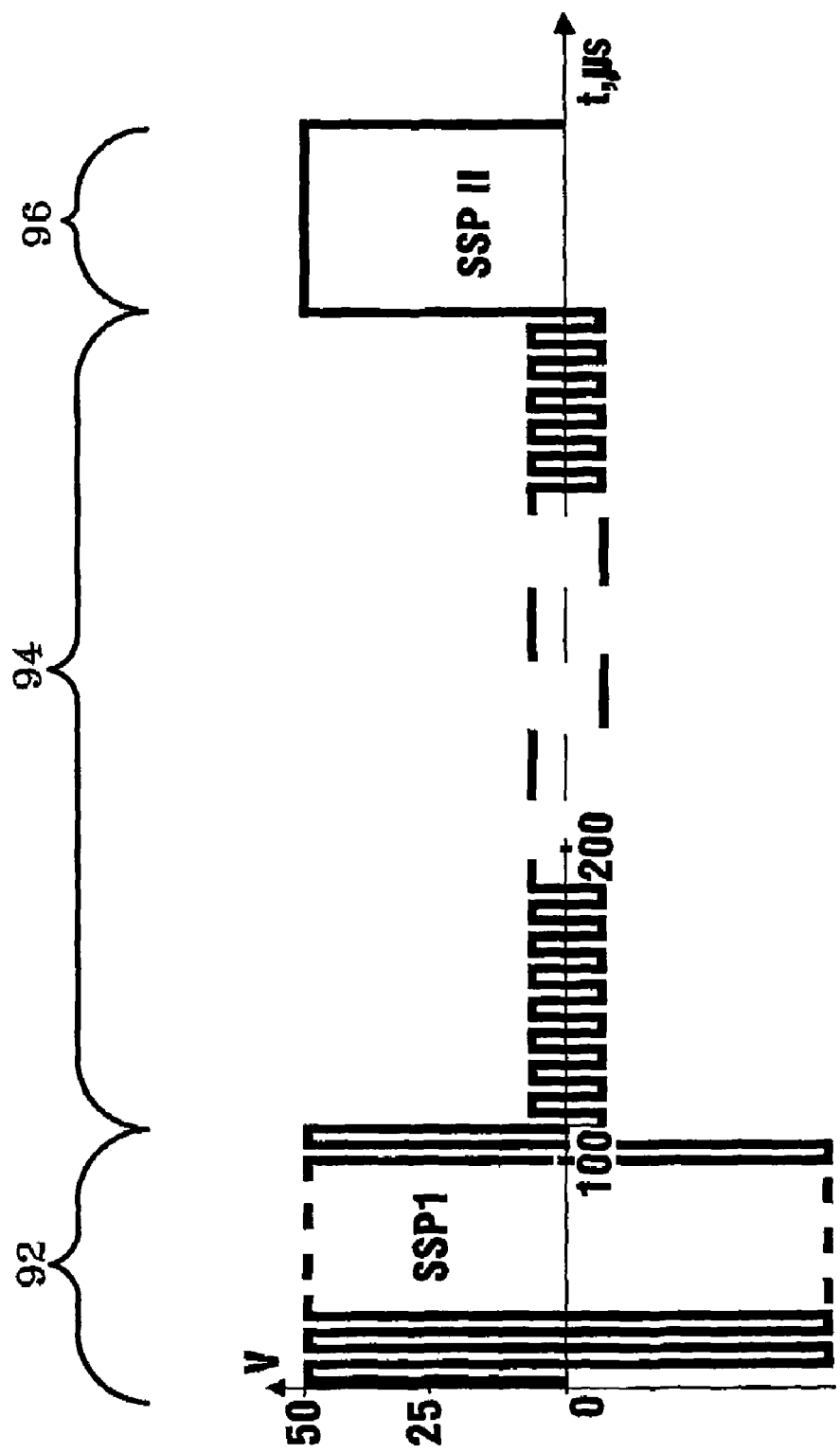
Figure 13B:
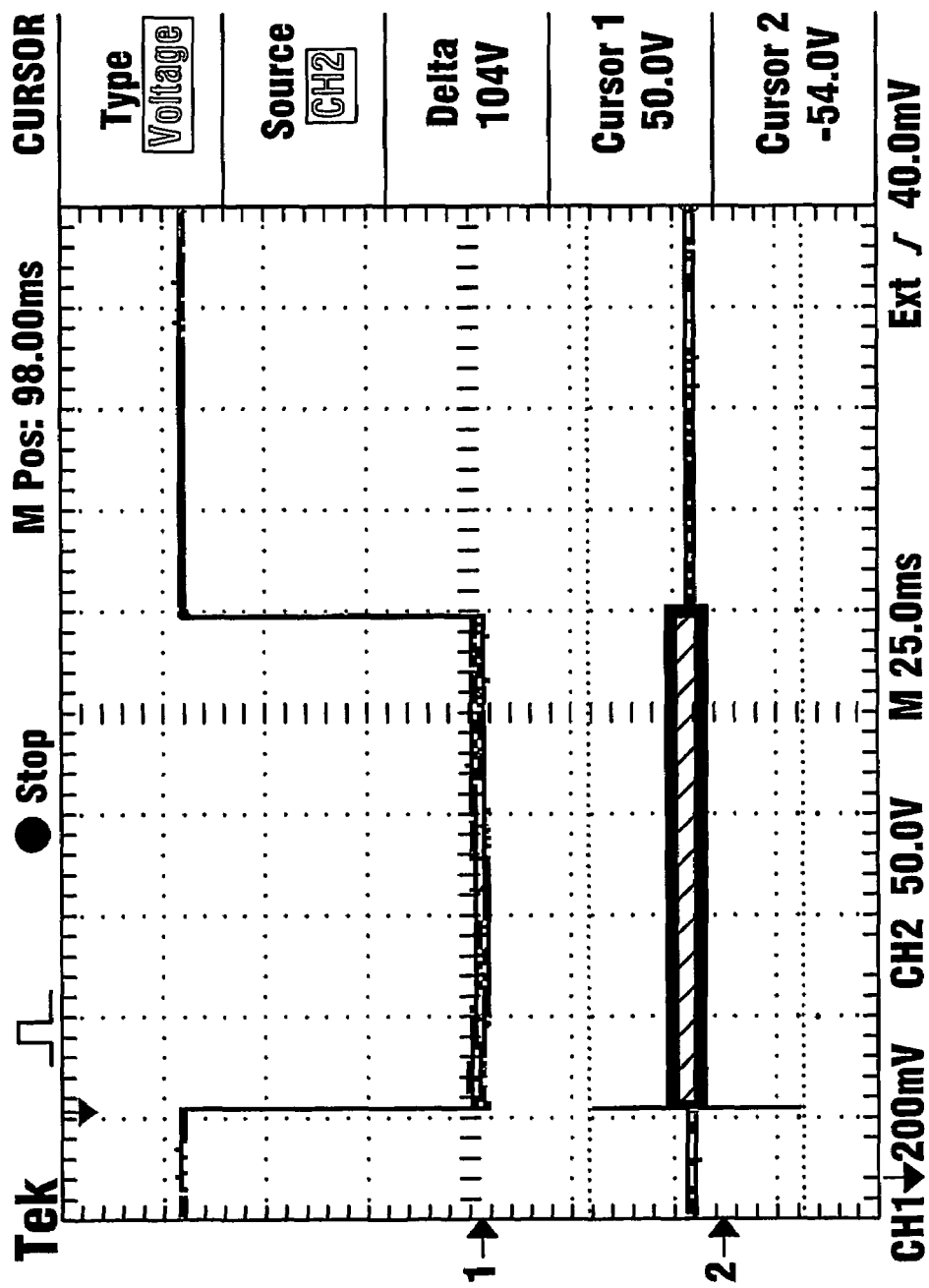
FIG. 13B shows the corresponding dynamic of the optical response measured by the photodetector.

A similar fast switching transition can be achieved between the states O and B (see FIG. 11). As seen in FIGS. 13A and 13B, a first SSP or transition pulse 92 (duration 0.12 ms, amplitude 50V at 50 kHz) produces a fast reorientation to the state B. A holding voltage pulse 94 of about 5V at 50 kHz follows to maintain the state B. The B state is then switched back to the initial O state by a second SSP or transition pulse 96 (duration 0.1 ms, amplitude 50V, frequency 5 kHz). Once again, the amplitude of the holding pulse to maintain the O state is zero. The B-state is closer to the planar state than the O state and is maintained by 50 kHz voltage. Here again, the holding voltages are separated by high-magnitude short-duration SSPs.

Figure 14:
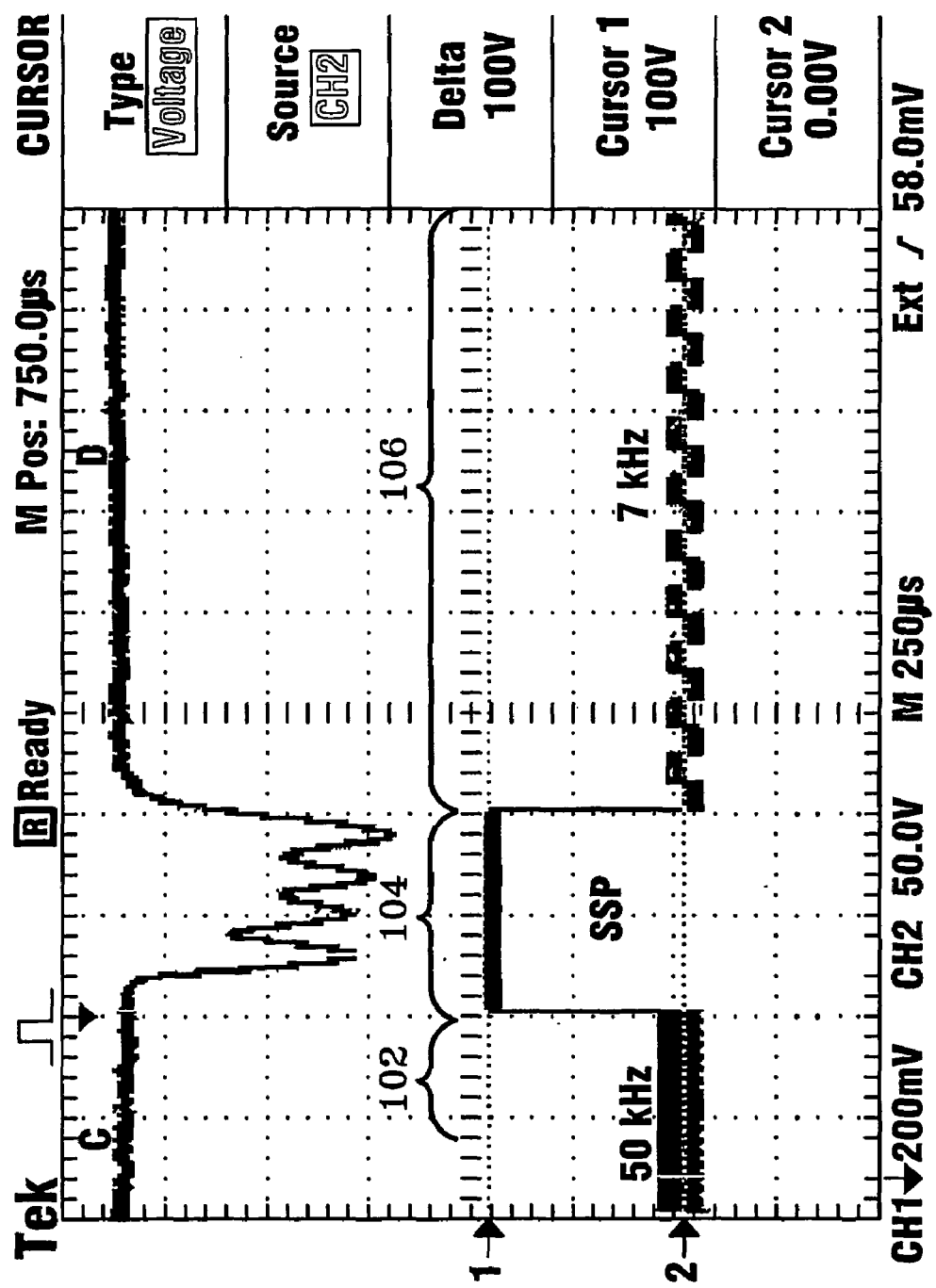
FIG. 14 illustrates a fast switching sequence for the transition from C→D shown in FIG. 11.

FIG. 14 shows the signal of photodiode 38 for the phase shift, which corresponds to the transition C→D in FIG. 11 which is designated by the numeral 100. The state C was obtained by an applied holding voltage pulse 102 at 50 kHz. To obtain the fast phase switching to state D, a transition pulse 104 with a constant amplitude of 100 V during 0.5 ms was applied. After that, the state D was maintained by applying a holding voltage 106 of 7 kHz. In this example a switching time of τ=0.5 ms for the optical retardation shift on $\Delta L_{C \rightarrow D}$=2.5 μm was obtained.

Figure 15:
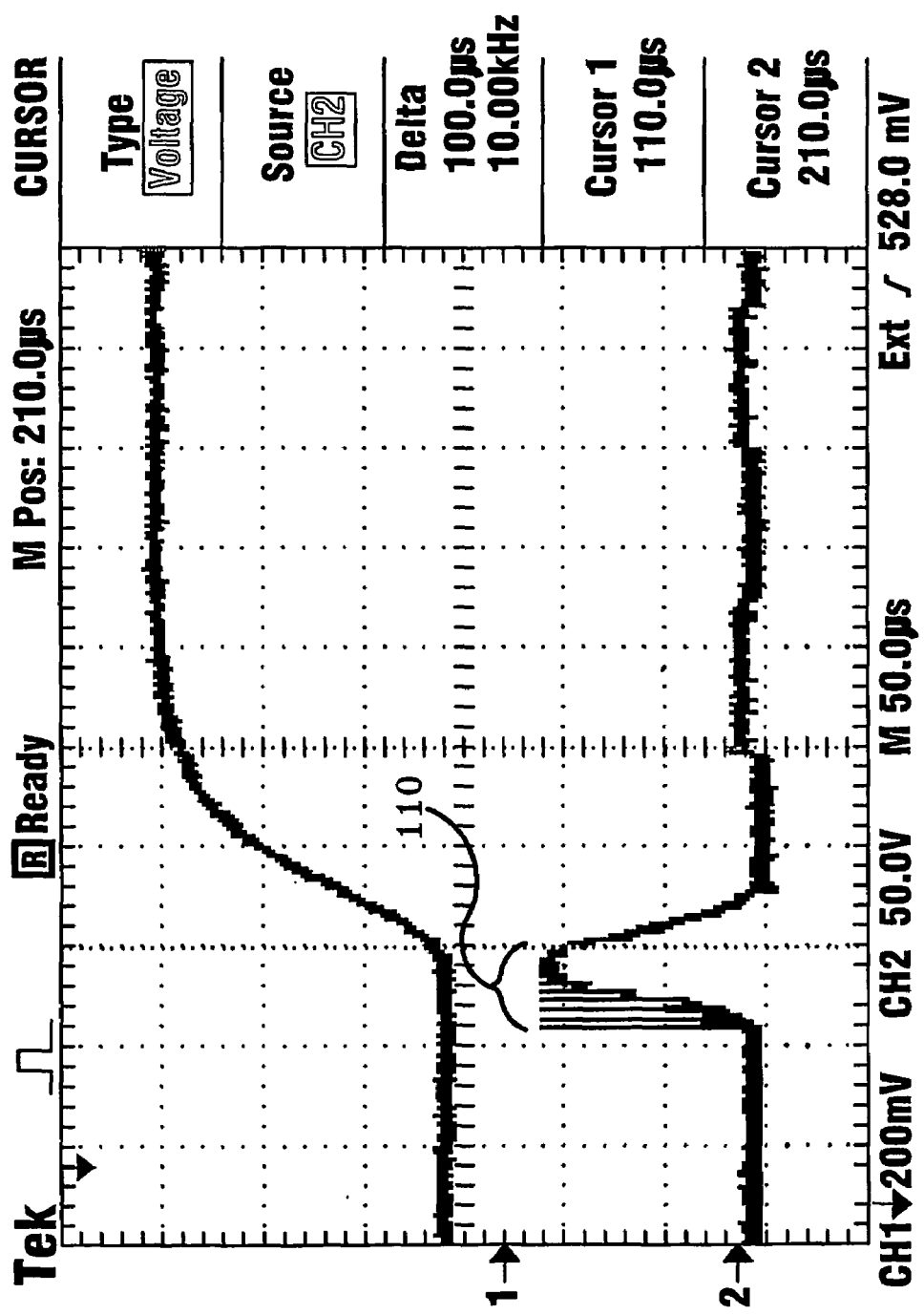
FIG. 15 is an exemplary waveform showing the phase shift of a dual frequency nematic cell and the applied voltage with a special form transition pulse which utilizes a half sinusoid waveform.

To further reduce the switching time in the dual-frequency nematic cell, it was determined that the profile of the SSP could be modified with with a special waveform, as shown in FIG. 15. The initial front of the SSP, or transition pulse 110 contains short pulses with decreasing amplitudes and the main part of the pulse is a half-period sinusoidal wave. Short pulses influence both parts of dielectric anisotropy and increase the time delay. The main pulse affects the positive part of dielectric anisotropy only. The level of transmitted signal starts to change in the moment of minimum amplitude of high frequency of applied voltage and maximum amplitude of low-frequency applied voltage. The high amplitude of the half-period sinusoidal SSP stimulates the fast phase shift. The holding voltage ended the process of reorientation and the total time response of shift ΔL=0.3 μm is about τ=100 μs.

It has also been determined that sometimes the transitions between different states are accompanied by a variation of the optical signal that develops over long periods of time (hundreds of milliseconds); however, the deviations are relatively small, 10% or less of the total amplitude of the signal.

In the description above, only the characteristics of the driving voltage (such as the amplitude and waveform of SSPs at two different frequencies) and temperature of the cell were adjusted. However, one can also use many other available parameters to further optimize the cell response, such as duration, frequency and profile of SSPs and holding voltage pulses, surface anchoring strength, viscoelastic, optical and dielectric constants of the liquid crystal material, etc.

Based upon the foregoing description of the liquid crystal cell 10 and its methods for driving the dual frequency liquid crystal material between an initial state and homeotropic and planar states, the advantages of the present invention are readily apparent. In particular, it is noted that the transition time between states can be reduced by about an order of magnitude by first applying a transition pulse and then applying a holding pulse. This allows for quicker phase retardation than any previously known method for driving an optical modulator, retarder, shutter, scanner or beam steering device. Moreover, the method is configured such that a wide range of phase retardation values can be obtained while still providing faster response times. Accordingly, a phase modulator employing the concepts of the present invention is much more robust inasmuch as it can provide a wider range of operation. Accordingly, the present invention is an advancement in the art of liquid crystal cells.

Based upon the foregoing disclosure, it should now be apparent that the method of the present invention will carry out the objects set forth hereinabove. It is, therefore, to be understood that any variations evident fall within the scope of the claimed invention and thus, the selection of specific component elements can be determined without departing from the spirit of the invention herein disclosed and described.

What is claimed is:

1. A method for fast switching a dual frequency liquid crystal cell, comprising:
   providing a liquid crystal cell, wherein said cell has opposed substrates with dual frequency liquid crystal material disposed therebetween, each said substrate associated with at least one electrode that is connected to a power supply able to apply different voltage magnitudes at different frequencies and each said substrate having an alignment layer to impart a high pretilt angle to the liquid crystal material, wherein no application of voltage results in the material exhibiting an initial state;
   applying a transition driving pulse of a first magnitude to the material at a first range of frequencies to accelerate a transition into a first state from the initial state;
   applying a holding pulse of a second magnitude to the material at said first range of frequencies to maintain said first state, wherein said second magnitude is less than said first magnitude;
   applying a transition driving pulse of a third magnitude to the material at a second range of frequencies to accelerate a transition into a second state from said first state; and
   applying a holding pulse of a fourth magnitude to the material at said second range of frequencies to maintain said second state, wherein said fourth magnitude is less than said third magnitude.

2. The method according to claim 1, wherein said sequence of a transition driving pulse and a holding pulse drives said liquid crystal cell from one desired value of optical phase retardation to another desired value of optical phase retardation, in the range between zero and $$\Delta \varphi = \frac{2\pi}{\lambda} \cdot d \cdot (n_e - n_o),$$

where λ is the wavelength of light, d is a thickness of said cell, $n_o$ is the ordinary refractive index, $n_e$ is the extraordinary refractive index.

3. The method according to claim 2, wherein said high pretilt angle is between about 10 to about 80 degrees.

4. The method according to claim 3, wherein one of the said holding pulses has a zero magnitude.

5. The method according to claim 4, wherein the electrodes are placed in the plane of the cell between the cell substrates and the electric field with voltage of different magnitudes and different frequencies is applied in the plane of the cell.

6. The method according to claim 4, wherein each said electrode is disposed on a corresponding substrate and the electric field with voltage of different magnitudes and different frequencies is applied perpendicular to the cell substrates.

7. The method according to claim 6, wherein the first and the second frequencies are the same.

8. The method according to claim 1, further comprising:
maintaining said liquid crystal cell at a predetermined temperature to further accelerate transitions from the initial state to said first state, and from said second state to the initial state.

9. The method according to claim 1, wherein said step of applying a transition driving pulse is a half-period sinusoid.

10. A method for switching a dual frequency liquid crystal cell, comprising:
providing a liquid crystal cell, wherein said cell has opposed substrates with dual frequency liquid crystal material disposed therebetween, each said substrate having at least one electrode that is connected to a power supply able to apply different voltage magnitudes at different frequencies and each said substrate having an alignment layer to impart a high pretilt angle to the liquid crystal material, wherein no application of voltage results in the material exhibiting an initial first state;
applying transition driving pulses of a first magnitude to the material in a first frequency range to obtain a first state;
applying holding pulses of a second magnitude to the material in said first frequency range to maintain said first state, wherein said second magnitude is less than said first magnitude; and
applying transition driving pulses of a third magnitude in a second frequency range to obtain said initial state, wherein said third magnitude is greater than said second magnitude.

11. The method according to claim 10, wherein said applying transition driving pulse of a first magnitude step drives the liquid crystal material to a homeotropic state, and wherein said first frequency range is less than said second frequency range.

12. The method according to claim 10, wherein said applying transition driving pulse of a first magnitude step drives the liquid crystal material to a planar state, and wherein said first frequency range is greater than said second frequency range.

13. The method according to claim 10, wherein said high pretilt angle is between about 10 to 80 degrees.

14. The method according to claim 10, further comprising:
maintaining said liquid crystal cell at a predetermined temperature to further accelerate transitions from the initial state to said first state, and from said second state to the initial state.

15. A liquid crystal cell, comprising
a pair of opposed substrates having a cell gap therebetween;
a dual frequency nematic liquid crystal material disposed in said cell gap;
a high-tilt alignment layer disposed on each said substrate to align said material into an initial state;
at least one electrode coupled to each of said substrates; and
a power supply connected to said electrode for
a) applying a transition driving pulse to said material at a first magnitude in a first frequency range to change said initial state to a first state; and
b) applying a holding pulse to said material at a second magnitude in said first frequency range; and
(c) applying a return pulse to said material at a third magnitude in a second frequency range different from said first frequency range.

16. The cell according to claim 15, wherein said material has a changeover frequency, and wherein said first frequency range is greater than said changeover frequency and said second frequency range is less than said changeover frequency.

17. The cell according to claim 16, wherein each said electrode is disposed between said alignment layer and said substrate.

18. The cell according to claim 16, wherein each said electrode is positioned between said substrates so that said transition driving pulse, said holding pulse and said return pulse are applied in the plane of the cell.

19. The cell according to claim 16 further comprising: a temperature regulator coupled to said substrates to maintain said liquid crystal within a predetermined temperature range.

* * * * *